US010855836B2

United States Patent
Liu et al.

(10) Patent No.: US 10,855,836 B2
(45) Date of Patent: Dec. 1, 2020

(54) DEFAULT FILTER SETTING SYSTEM AND METHOD FOR DEVICE CONTROL APPLICATION

(71) Applicant: Avast Software s.r.o., Prague (CZ)

(72) Inventors: Jinshan Liu, Arlington, VA (US); Richard Kmieciak, San Francisco, CA (US); Juyong Do, Cupertino, CA (US); Rajarshi Gupta, Los Altos, CA (US)

(73) Assignee: Avast Software s.r.o., Prague (CZ)

( * ) Notice: Subject to any disclaimer, the term of this patent is extended or adjusted under 35 U.S.C. 154(b) by 9 days.

(21) Appl. No.: 16/140,035

(22) Filed: Sep. 24, 2018

(65) Prior Publication Data

US 2020/0099783 A1    Mar. 26, 2020

(51) Int. Cl.
*H04M 3/42* (2006.01)
*G06N 3/08* (2006.01)
*H04L 29/06* (2006.01)

(52) U.S. Cl.
CPC .......... *H04M 3/42153* (2013.01); *G06N 3/08* (2013.01); *H04L 63/102* (2013.01)

(58) Field of Classification Search
CPC ..... H04M 3/42153; G06N 3/08; H04L 63/102
USPC ....................................................... 455/418
See application file for complete search history.

(56) References Cited

U.S. PATENT DOCUMENTS

| 2010/0169910 | A1* | 7/2010 | Collins | G06Q 30/0251 725/14 |
| 2013/0150004 | A1* | 6/2013 | Rosen | H04W 8/22 455/414.1 |
| 2014/0344861 | A1* | 11/2014 | Berner | H04N 21/4826 725/46 |
| 2017/0041454 | A1* | 2/2017 | Nicholls | H04L 67/16 |
| 2017/0277796 | A1* | 9/2017 | Kim | G06F 16/958 |
| 2019/0050710 | A1* | 2/2019 | Wang | G06N 3/04 |

OTHER PUBLICATIONS

International Search Report dated Oct. 18, 2019 for PCT/US 2019052445.

* cited by examiner

*Primary Examiner* — Charles N Appiah
*Assistant Examiner* — Nicole M Louis-Fils
(74) *Attorney, Agent, or Firm* — Dovas Law, P.C.

(57) ABSTRACT

A content filter setting method includes enabling a user to choose a setting of a filter for a particular application in a user interface of a user device. The setting of the filter is received from the user via the user interface, and a model is applied to determine a plurality of default settings of a plurality of filters of the particular application based on the setting of the filter and the identifying information of the user. The plurality of default settings is displayed in the user interface, and modified settings of the default settings are received via the user interface.

21 Claims, 26 Drawing Sheets

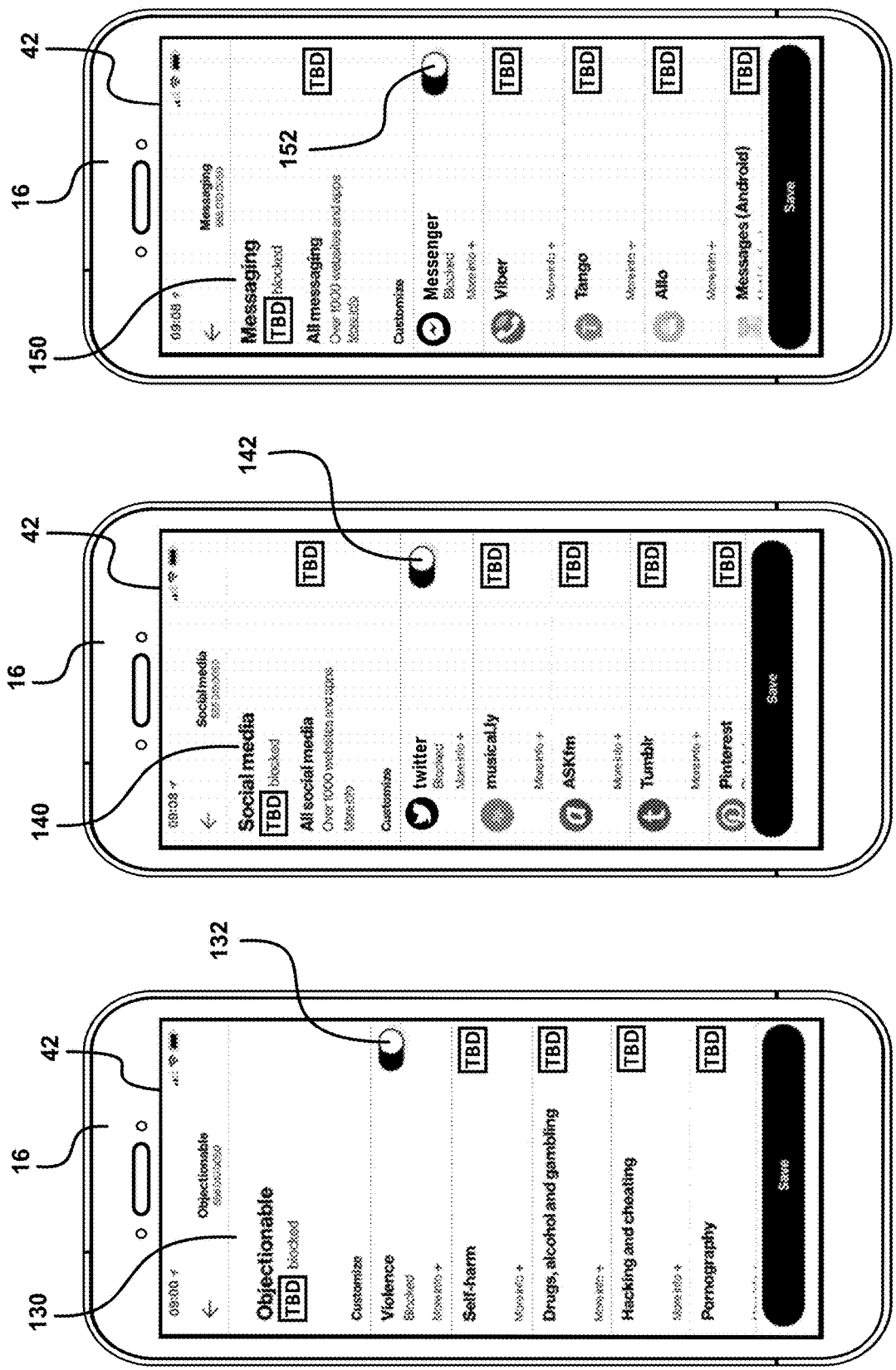

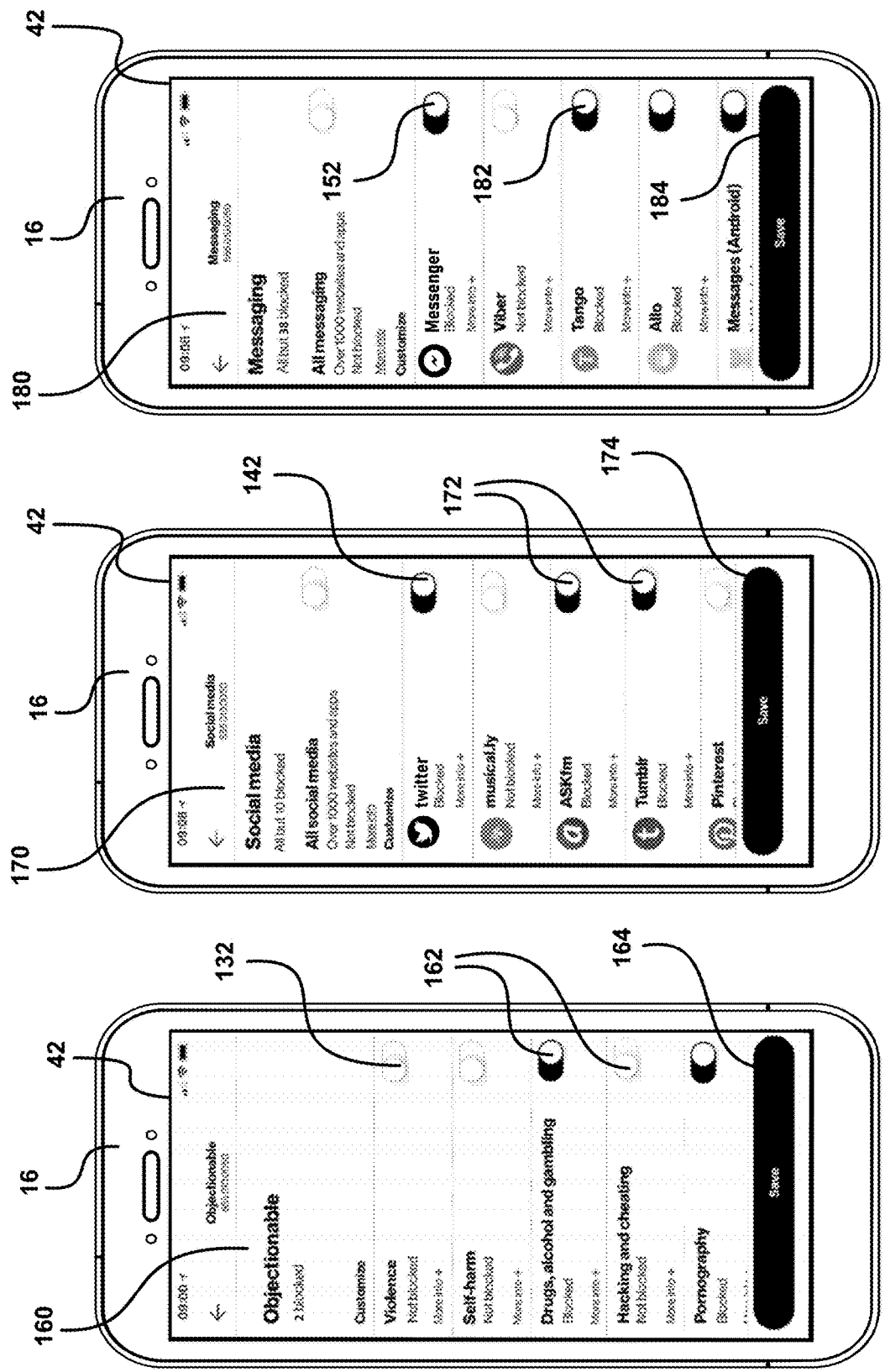

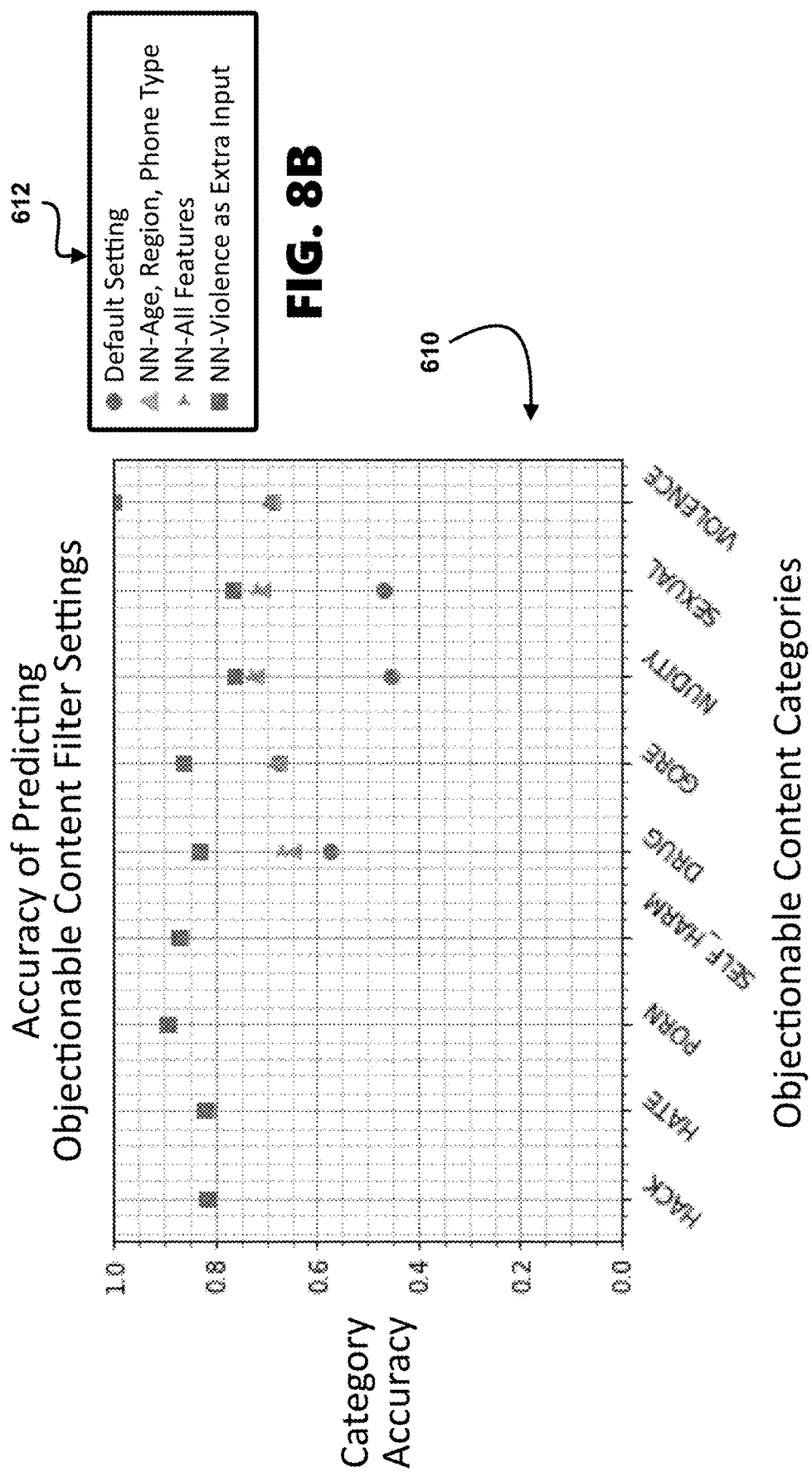

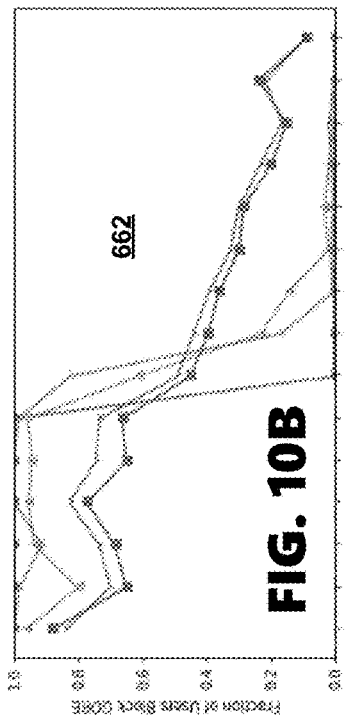
FIG. 10A
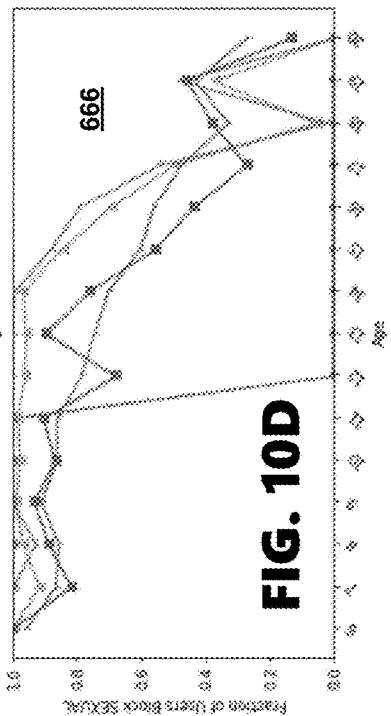
FIG. 10B
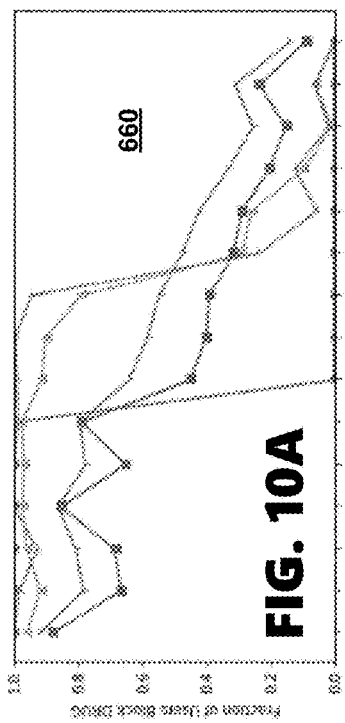
FIG. 10C
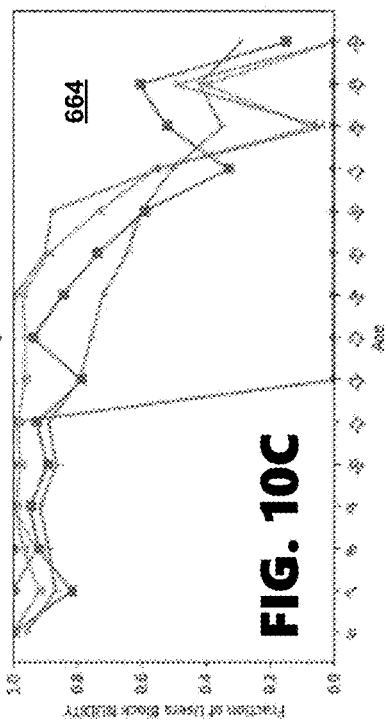
FIG. 10D
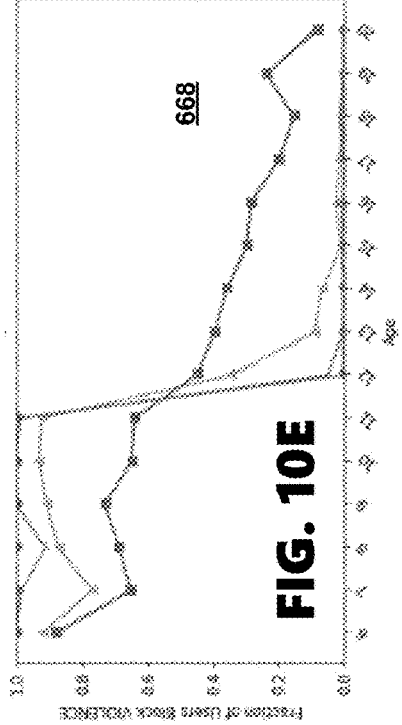
FIG. 10E
Objectionable Content- Fraction of Users That Block Category 670
- Default Settings
- NN-Age, Region, Phone Type
- NN-All Features
- NN-Violence as Extra Input
- User Settings
FIG. 10F

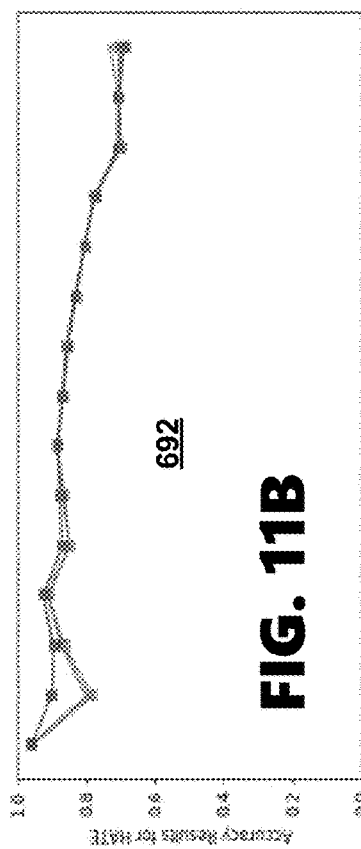
FIG. 11A
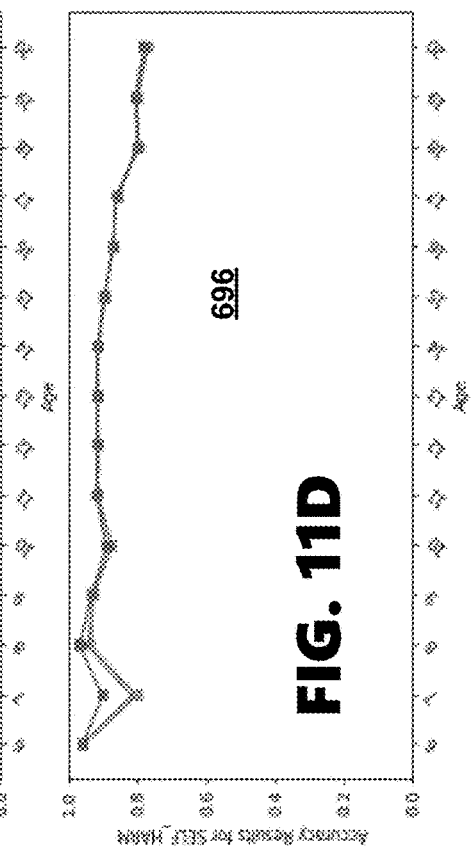
FIG. 11B
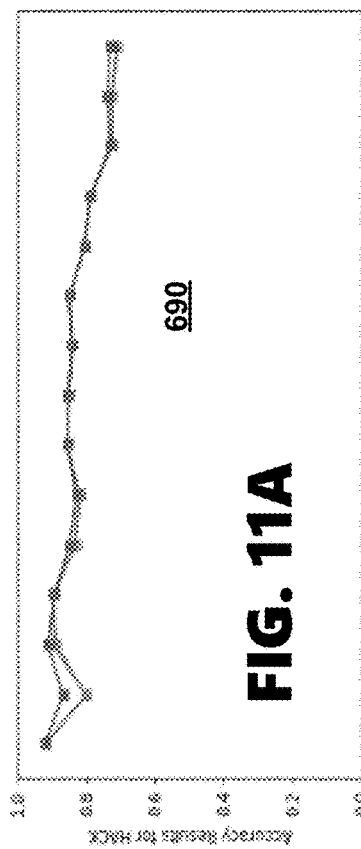
FIG. 11C
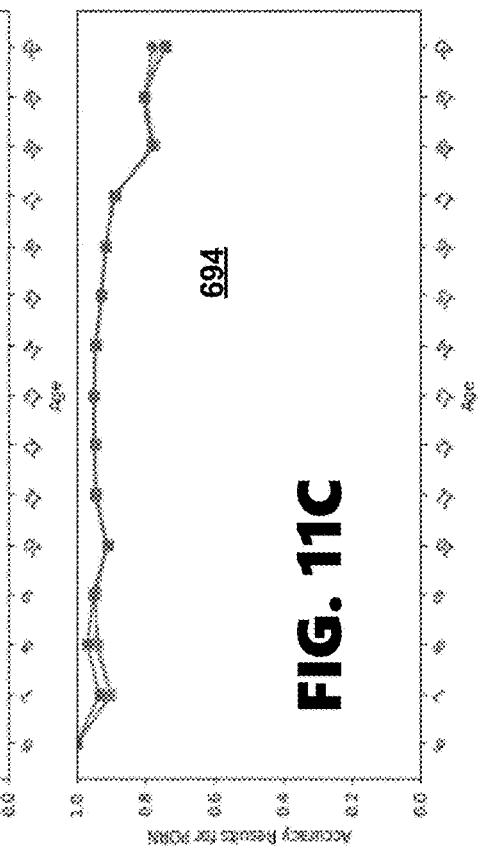
FIG. 11D
Objectionable Content-
Accuracy by Age
- Default Setting
- NN-Age, Region, Phone Type
- NN-All Features
- NN-Violence as Extra Input
FIG. 11E

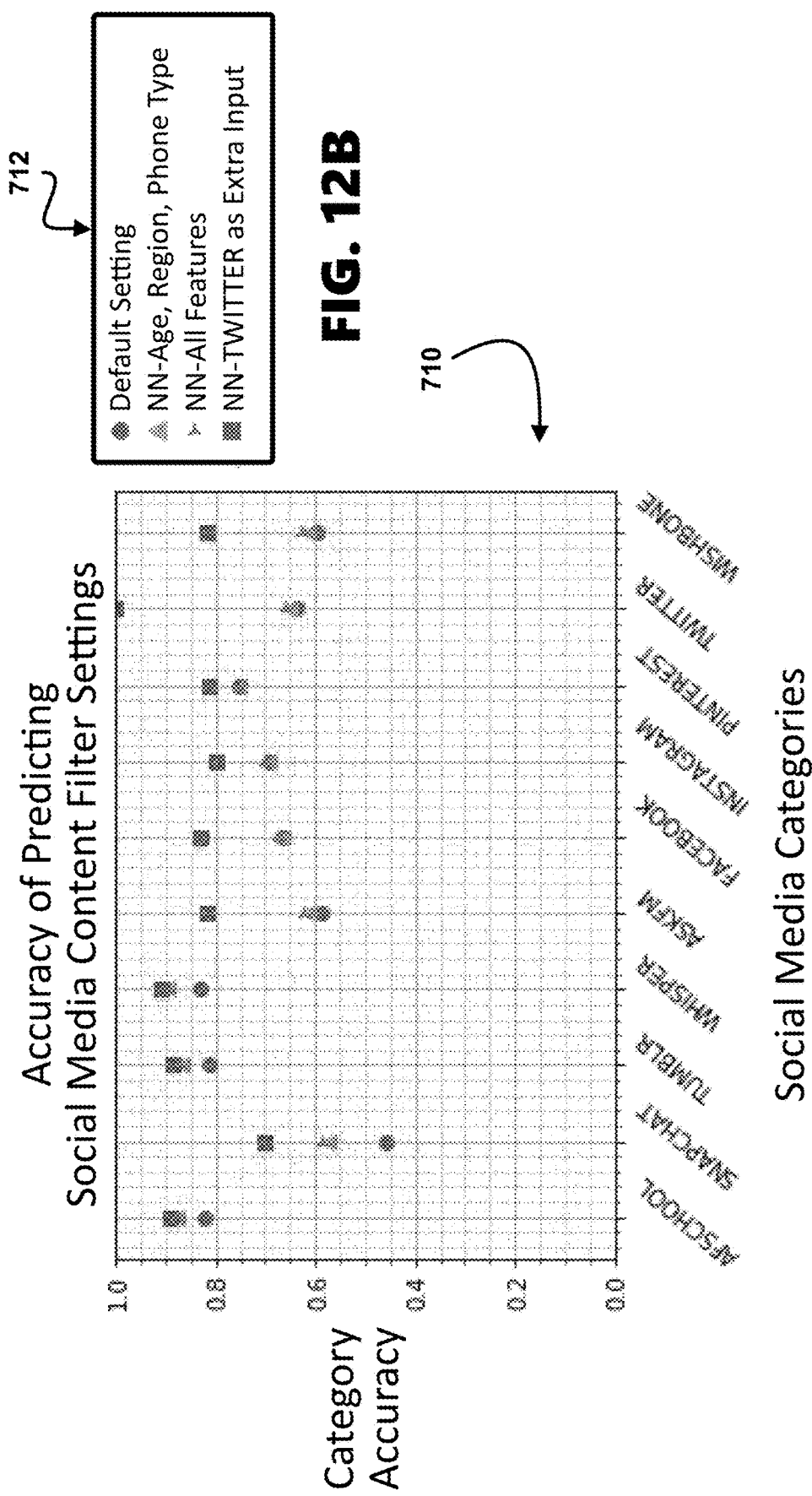

730

732

734

736

738

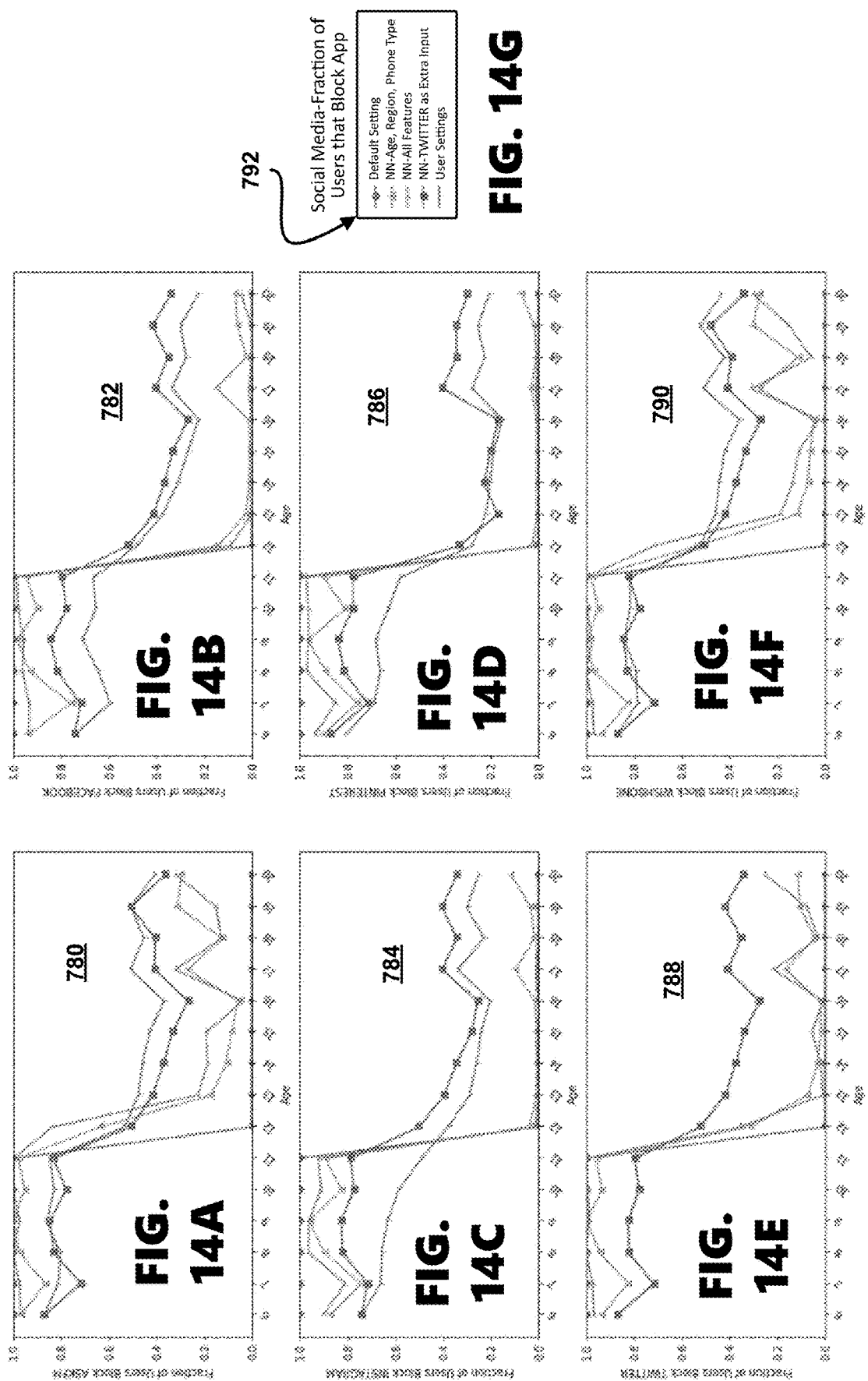

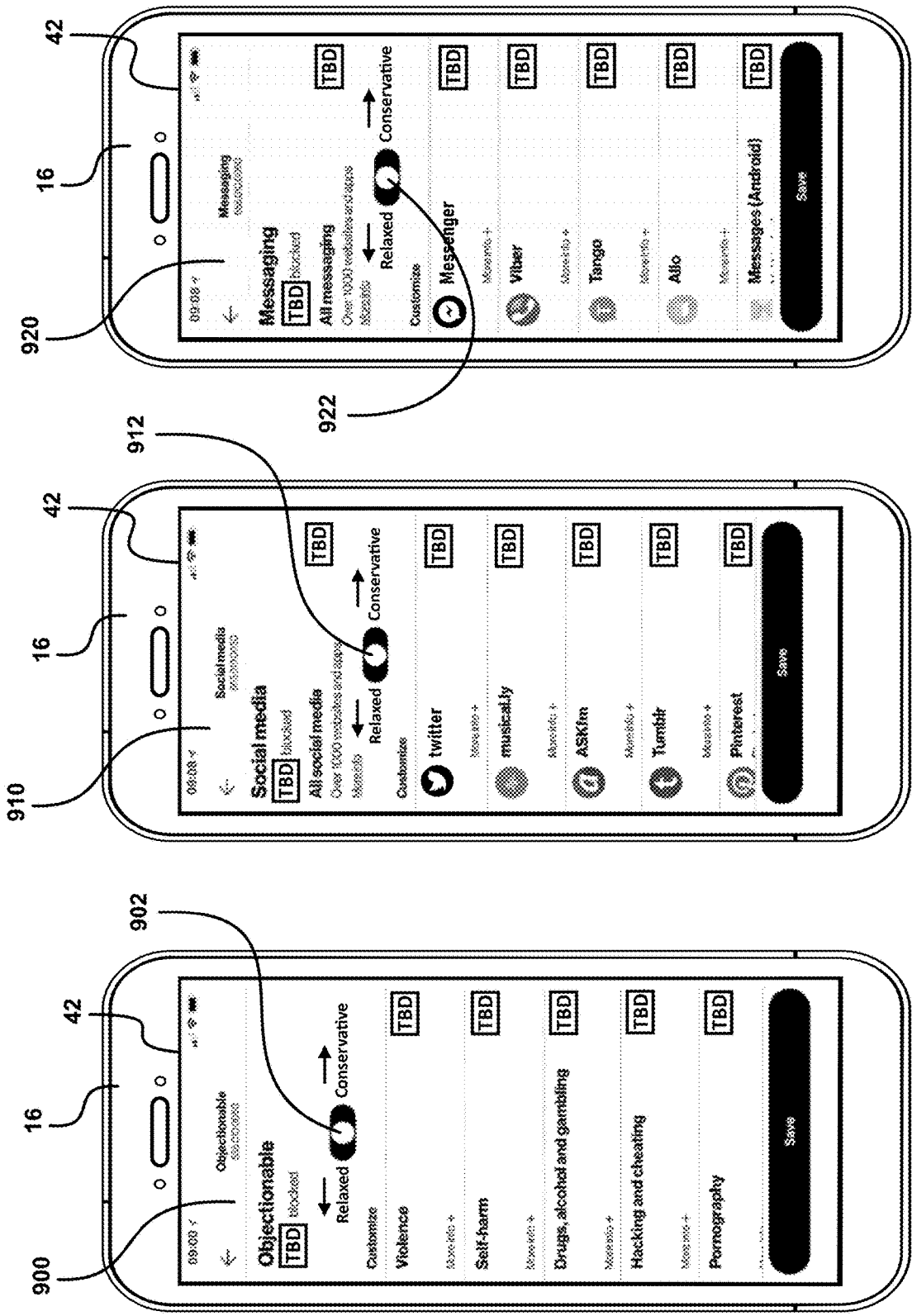

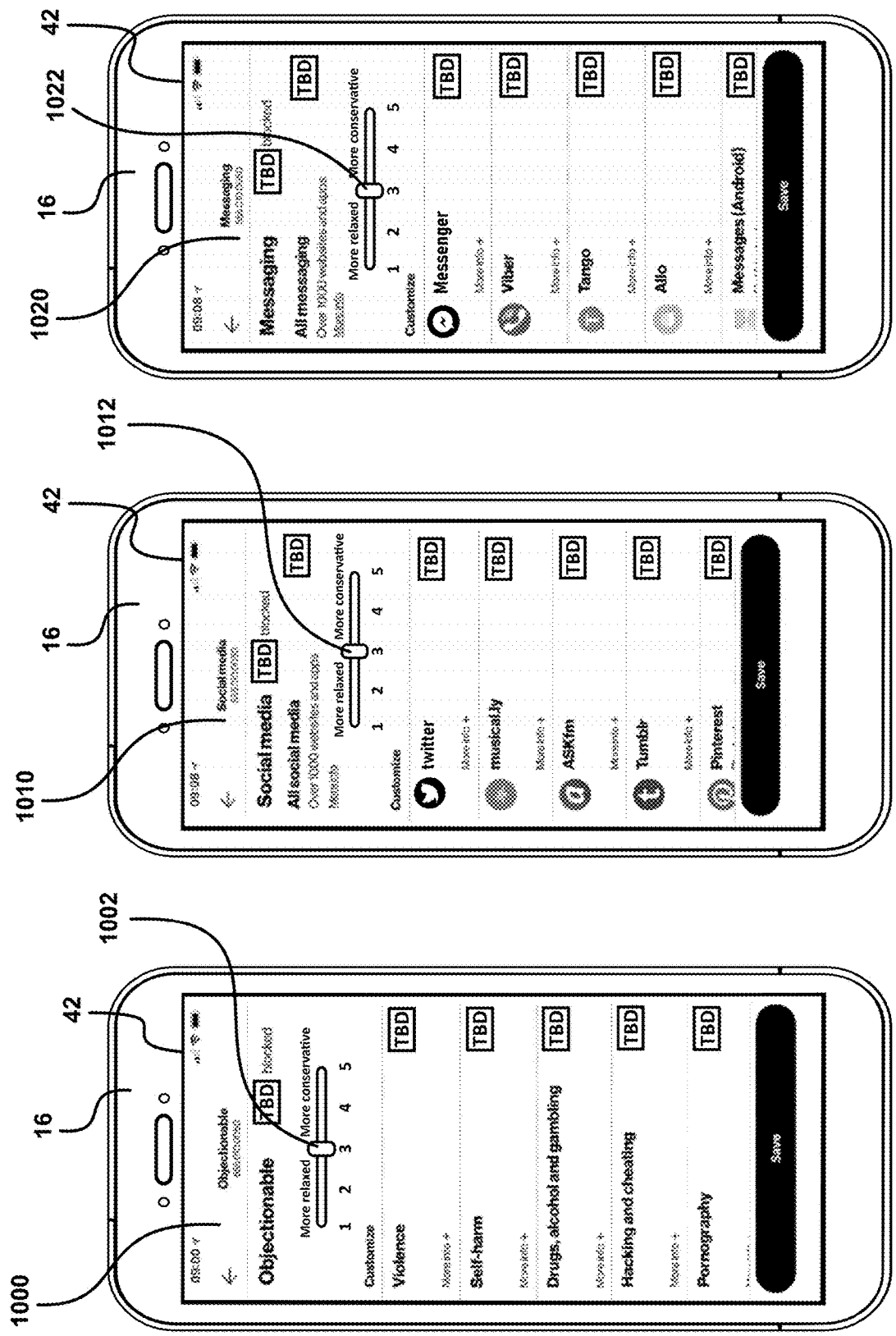

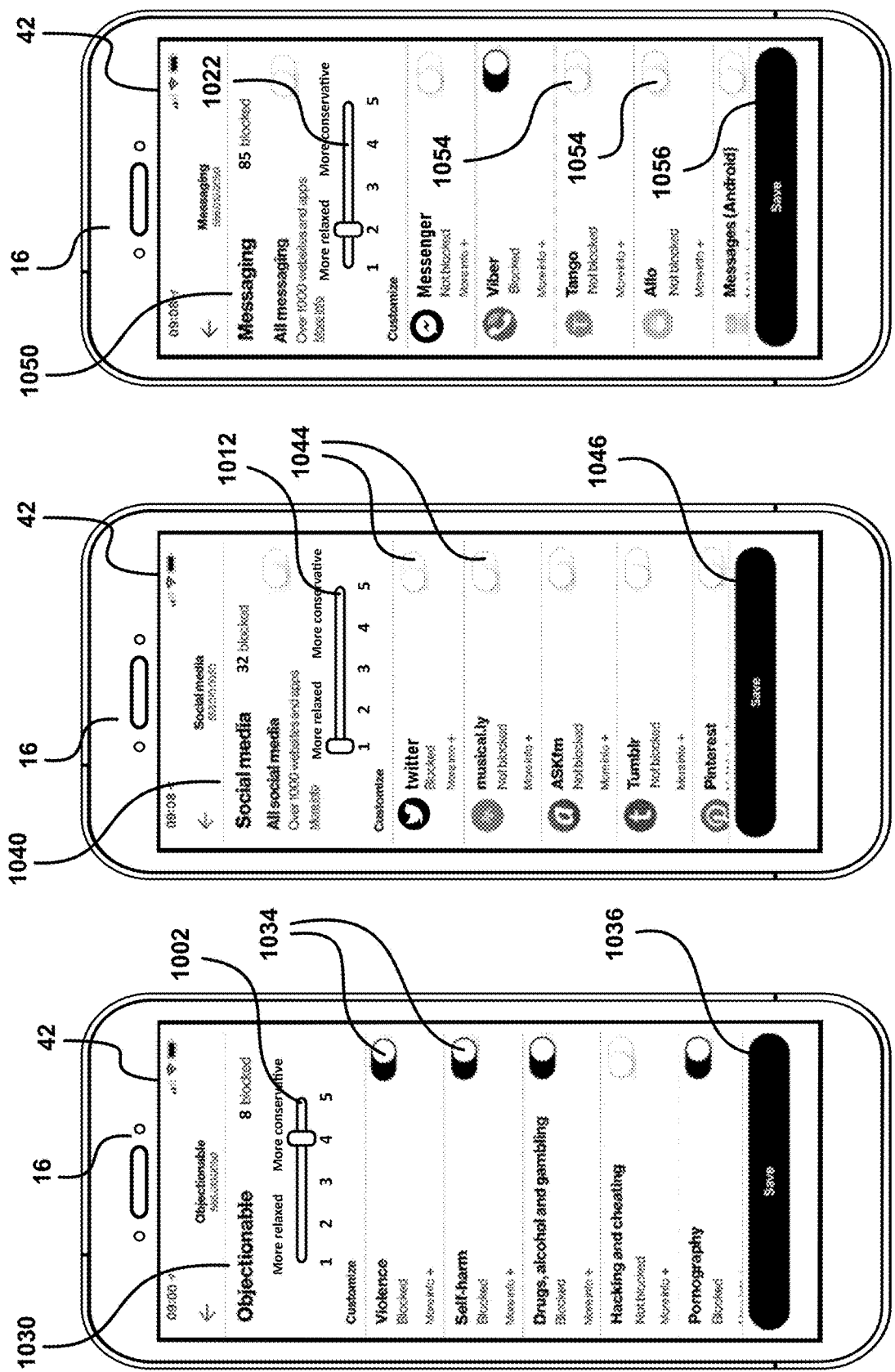

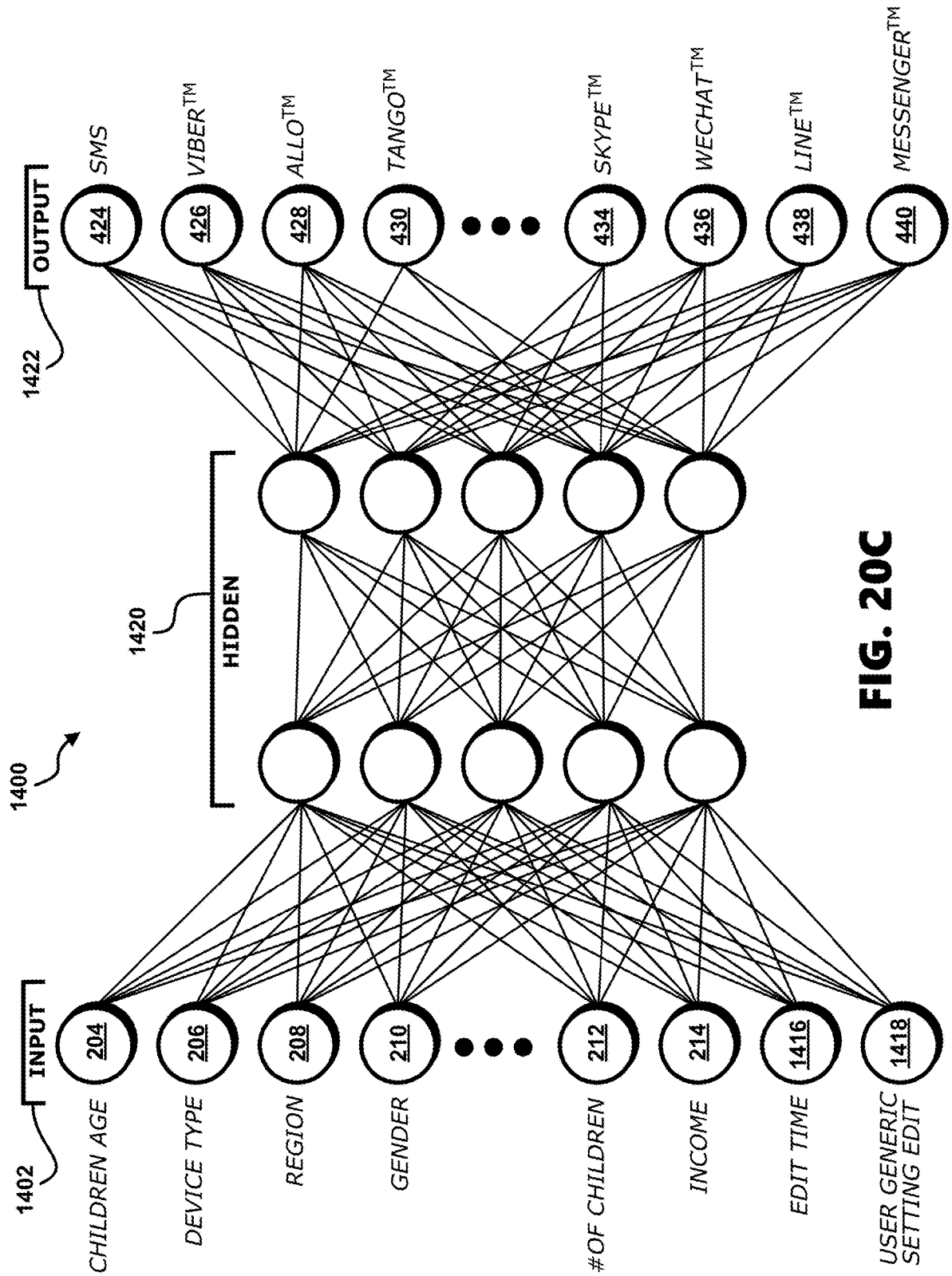

DEFAULT FILTER SETTING SYSTEM AND METHOD FOR DEVICE CONTROL APPLICATION

FIELD OF INVENTION

The invention relates generally to application setup protocols, and more particularly to default settings in device control applications.

BACKGROUND

Various applications are available for the control of content available on electronic devices such as smart phones, tablets, personal computers. Parents in particular frequently want to control what content is available to their children on their children's electronic devices. Device control applications may permit customization to allow an authority figure such as a parent to specifically select content or applications a supervised user such as a child has access to.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A content filter setting method is provided. The method includes enabling a plurality of users to choose a plurality of filter settings of a plurality of filters of a particular application, receiving the plurality of filter settings from the plurality of users, and receiving a plurality of identifying information of the plurality of users. An artificial neural network is trained based at least on the plurality of filter settings and the plurality of identifying information of the plurality of users. A particular user is enabled to choose a particular setting of a particular filter of the particular application in a user interface of a particular user device. The particular setting of the particular filter is received from the particular user via the user interface, and particular identifying information of the particular user is received. The particular setting and the particular identifying information is input to the artificial neural network to generate a plurality of default settings of the plurality of filters of the particular application. The plurality of default settings are displayed in the user interface, and the particular user is enabled to modify the default settings via the user interface.

Further provided is a content filter setting method including enabling a particular user to choose a particular setting of a particular filter for a particular application in a user interface of a particular user device. The particular setting of the particular filter is received from the particular user via the user interface. Identifying information of the particular user is also received. A model is applied to determine a plurality of default settings of a plurality of filters of the particular application based at least on the particular setting of the particular filter and the identifying information of the particular user. The plurality of default settings is displayed in the user interface, and modified settings of the default settings are received via the user interface.

Further provided is a network-enabled device control system. The system includes a server including one or more processors and one or more non-transitory computer readable storage media having encoded thereon instructions that when executed by the one or more processors cause the server to perform a process. The process includes enabling a particular user to choose a particular setting of a particular filter of a particular application in a user interface of a particular user device, receiving from the particular user via the user interface a particular setting of the particular filter, and receiving identifying information of the particular user. A model is applied to determine a plurality of default settings of a plurality of filters of the particular application based at least on the particular setting of the particular filter and the identifying information of the particular user. A displaying of the plurality of default settings is enabled in the user interface, modified settings of the default settings are received via the user interface, and an indication of the modified settings are transmitted by the server.

The network-enabled device control system further includes a computing device including one or more processors and one or more non-transitory computer readable storage media having encoded thereon instructions that when executed by the one or more processors cause the computing device to perform a process. The process performed by the computing device includes receiving the indication of the modified settings from the server, and restricting via the particular application data accessible on the computing device based on the indication of the modified settings.

Further provided is a content filter setting method. The method includes enabling a plurality of users to choose a plurality of filter levels of a plurality of filters of a particular application and enabling the plurality of users to choose a plurality of filter settings of the plurality of filters of the particular application. The plurality of filter levels and the plurality of filter settings are received from the plurality of users. A plurality of identifying information of the plurality of users is further received, and an artificial neural network is trained at least based on the plurality of filter levels, the plurality of filter settings, and the plurality of identifying information of the plurality of users. A particular user is enabled to choose a particular filter level of the plurality of filters of the particular application via a user interface of a particular user device. The particular filter level is received from the particular user via the user interface and particular identifying information of the particular user is received. The particular filter level and the particular identifying information is input to the artificial neural network to generate a plurality of default settings of the plurality of filters of the particular application. The plurality of default settings are displayed in the user interface, and the particular user is enabled to modify the default settings via the user interface.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 1 shows a system enabling particular filter setting methods according to the illustrative embodiments.

FIGS. 2A-2C, 3A-3C, and 4A-4C show a supervisory user device implementing a settings application for setting control rules for a filter agent on a controlled computing device.

FIGS. 5A, 5B, and 5C are diagrams showing figuratively artificial neural networks for generating a plurality of default settings of a plurality of filters implemented by the filter agent on the controlled computing device.

FIGS. 8A and 8B are a scatter chart and the scatter chart's key showing accuracies of predicted filter settings by category in an exemplary implementation of a trial artificial neural network for setting device control filters.

FIGS. 10A-10F are line charts and a chart key showing a decimal of test users that block particular categories as compared to predictions of a trial artificial neural network for setting device control filters.

FIGS. 11A-11E are line charts and a chart key showing accuracy of predicted filter settings by age of test users in an implementation of a trial artificial neural network for setting device control filters.

FIGS. 12A and 12B are a scatter chart and the scatter chart's key showing accuracies of predicted filter settings by category in an exemplary implementation of a trial artificial neural network for setting device control filters.

FIGS. 14A-14G are line charts and a chart key showing a decimal of test users that block particular categories as compared to predictions of a trial artificial neural network for setting device control filters.

FIGS. 16A-16C and 17A-17C show a supervisory user device implementing another settings application for setting control rules for a filter agent on a controlled computing device.

FIGS. 18A-18C and 19A-19C show a supervisory user device implementing yet another settings application for setting control rules for a filter agent on a controlled computing device.

Figure 20A:
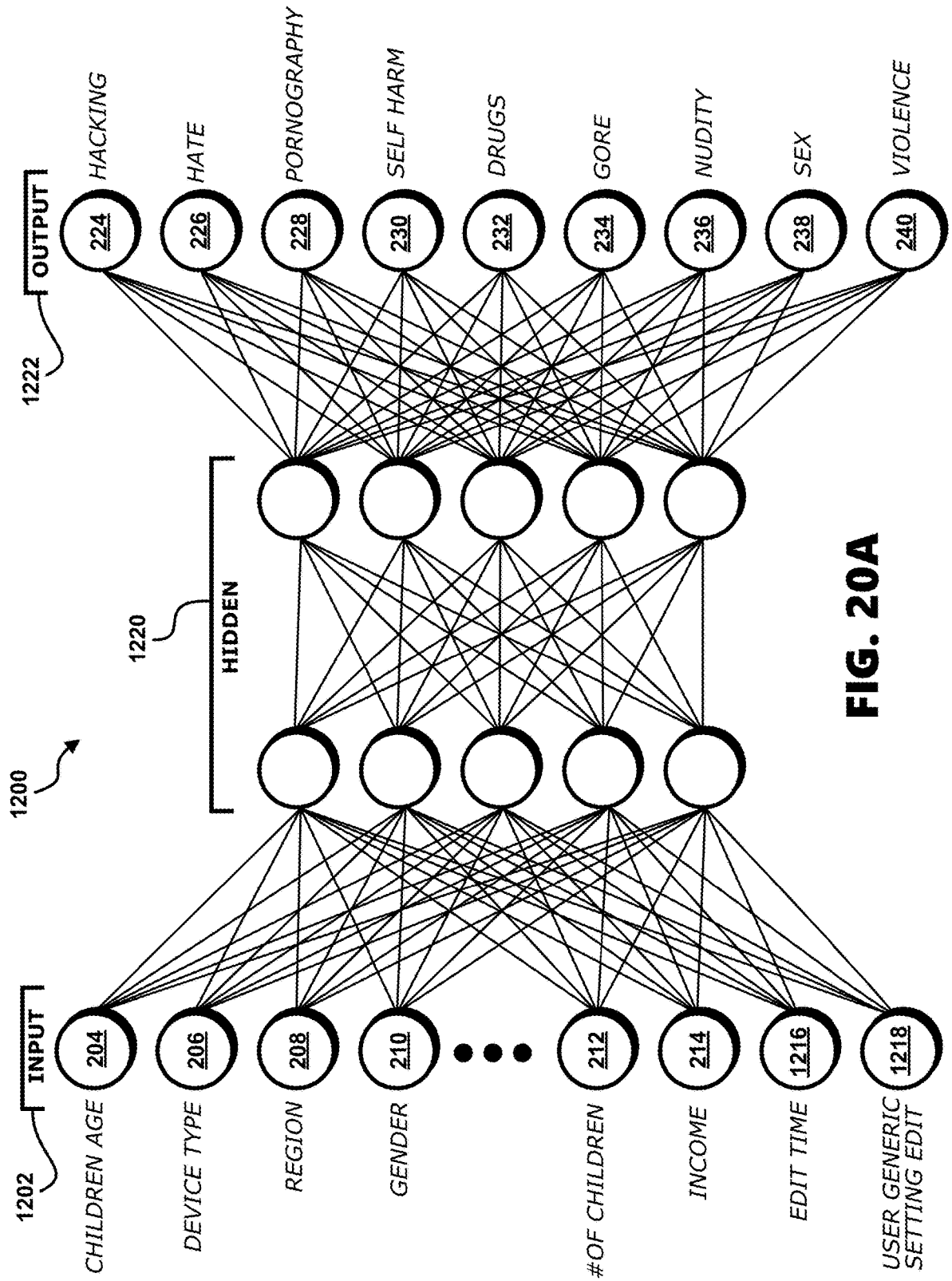
Figure 20B:
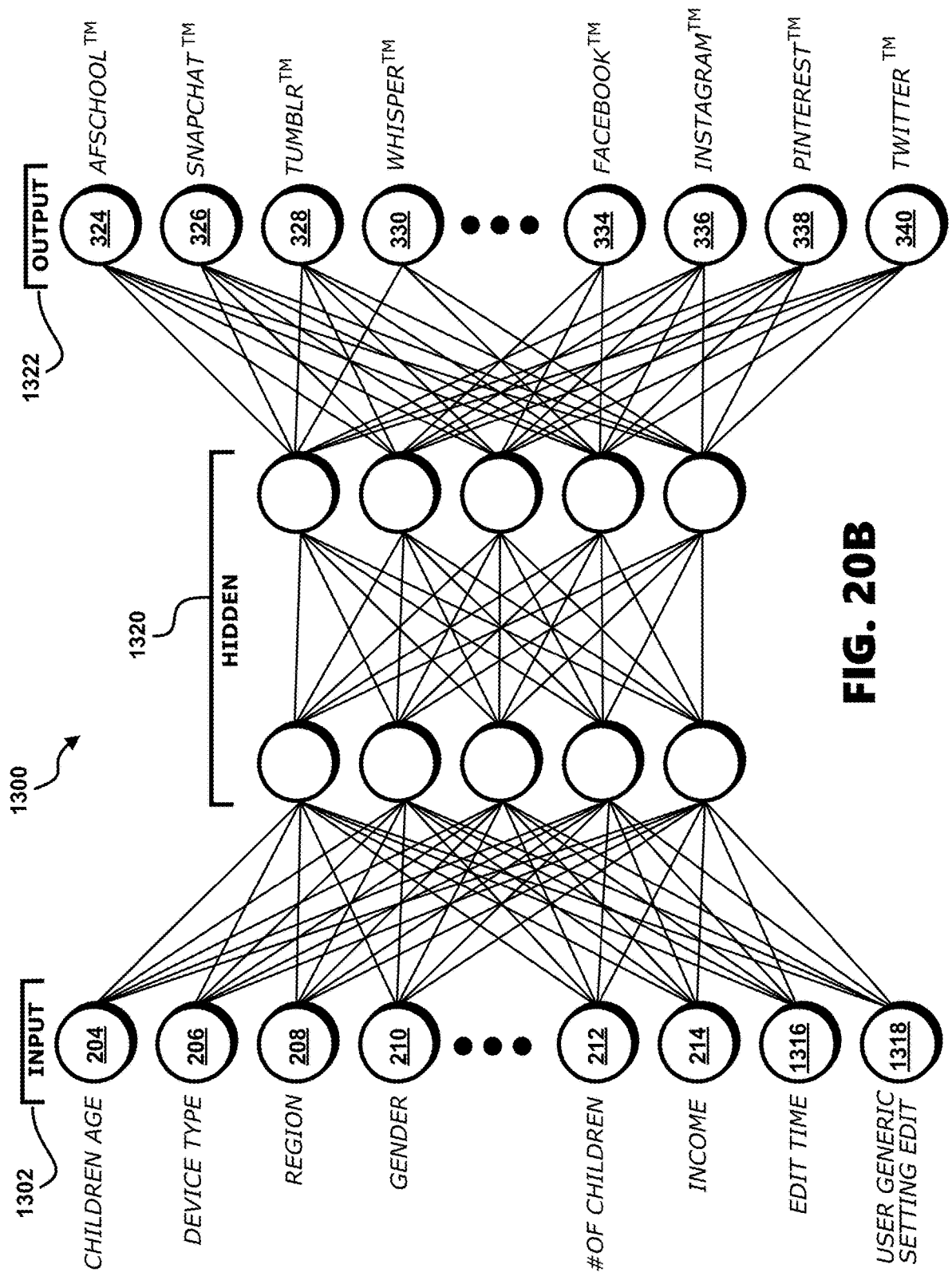

FIGS. 20A, 20B, and 20C are diagrams showing figuratively other artificial neural networks for generating a plurality of default settings of a plurality of filters implemented by the filter agent on the controlled computing device.

Figure 21:
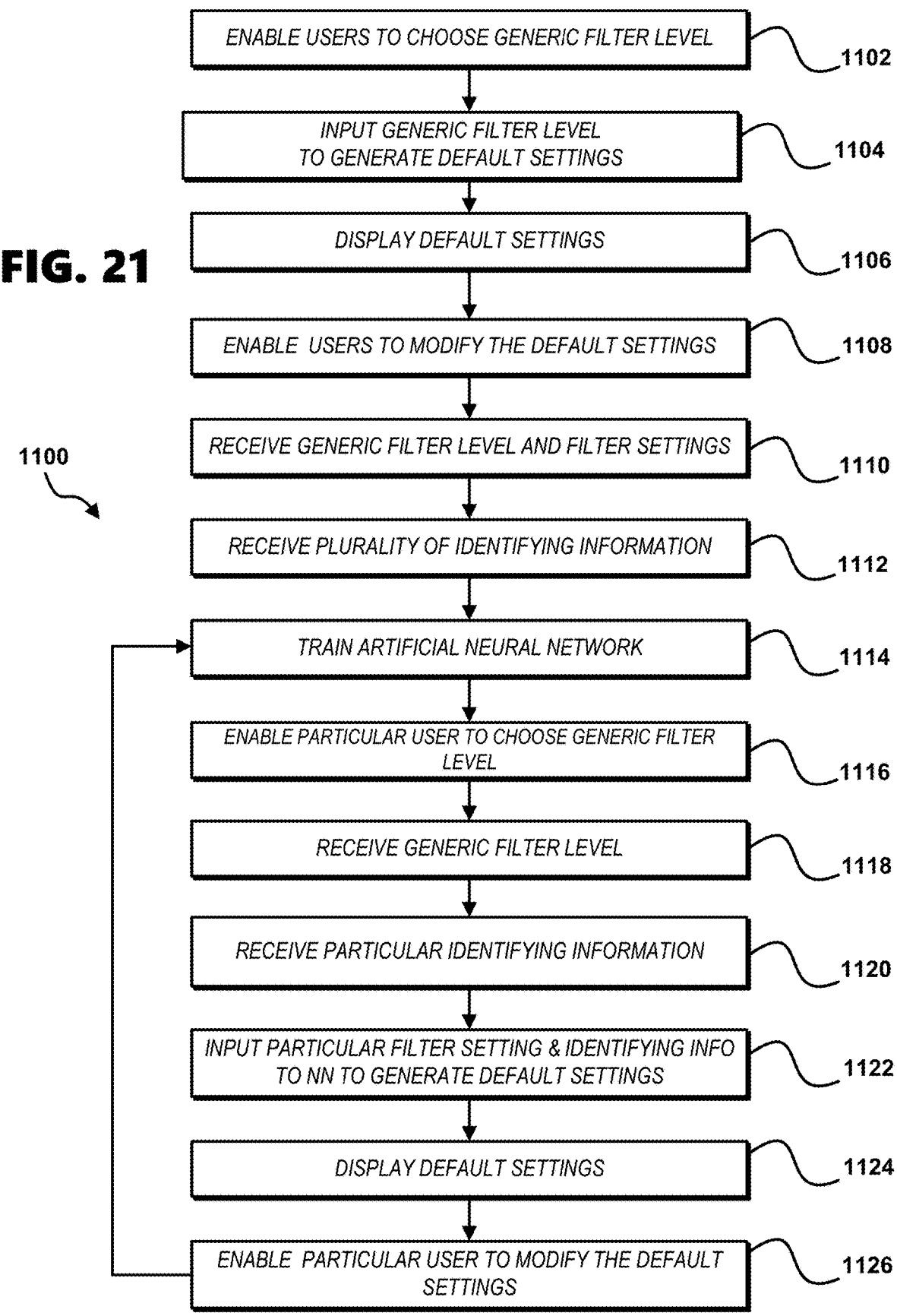

FIG. 21 is a flow chart showing another default filter setting method according to an illustrative embodiment.

DETAILED DESCRIPTION OF ILLUSTRATIVE EMBODIMENT(S)

Embodiments of the invention are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Figure 1:
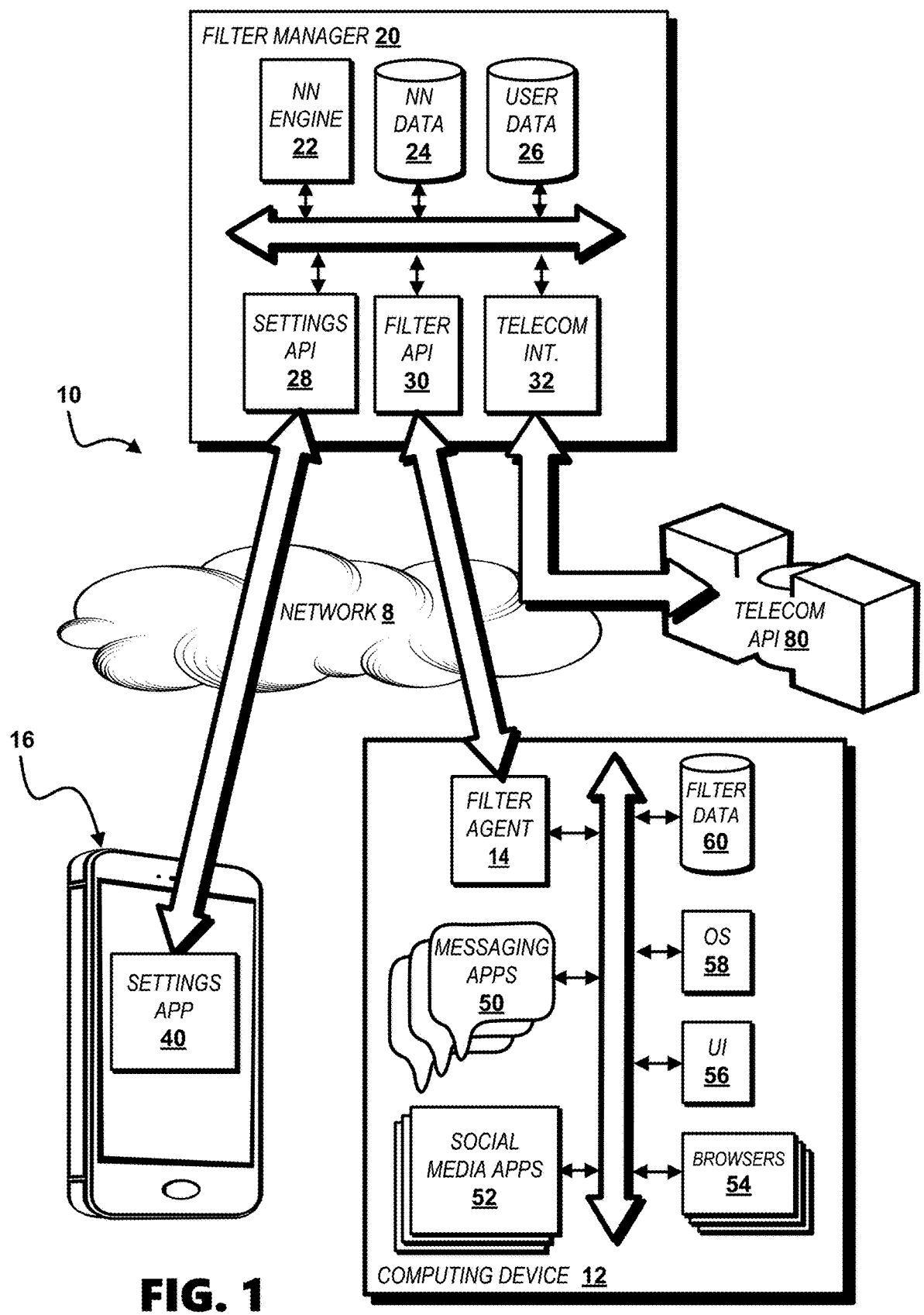

Referring to FIG. 1, a system 10 for enabling control of a computing device 12 is provided in a communications network 8 including one or more wired or wireless networks or a combination thereof, for example including a local area network (LAN), a wide area network (WAN), the Internet, mobile telephone networks, and wireless data networks such as WiFi™ and 3G/4G/5G cellular networks. The system 10 permits a supervisory user operating a user device 16 to set controls for a computing device 12 operated by a supervised user, for example a child of a parent supervisory user.

The computing device 12 and user device 16 operate in the network 8. The computing device 12 and user device 16 can each include for example a smart phone or other cellular-enabled mobile device configured to operate on a wireless telecommunications network. Alternatively, the computing device 12 and user device 16 can each include a personal computer, tablet device, or other computing device. A user operates the computing device 12 with a filter agent 14 active, the filter agent 14 functioning as a content control application on the computing device 12. Software and/or hardware residing on the computing device 12 enables the filter agent 14 to monitor and restrict content accessible by the computing device 12. Software and/or hardware residing on the computing device 12 further enables messaging applications 50, for example Short Message Service ("SMS") messaging applications or applications supporting other messaging protocols, social media applications 52, and Internet browsers 54, for example via 3G/4G/5G cellular protocols, WiFi™ protocol or TCP/IP through the Internet. A user can implement the messaging applications 50 for example to can connect to a message forwarding center, for example via GSM wireless protocol or TCP/IP through the Internet, to communicate with other user devices.

The filter agent 14 can be configured as a standalone application executable by a processor of the computing device 12 in communication with the messaging applications 50, social media applications 52, browsers 54, or other communication facilitating applications. Alternatively, the filter agent 14 can be provided as a processor-implemented add-on application integral with the messaging applications 50, social media applications 52, browsers 54, or other communication facilitating applications. The filter agent 14 is enabled to block applications, electronic communications, and media available to a user of the computing device 12 through the messaging applications 50, social media applications 52, browsers 54, or other communication facilitating applications.

The system 10 includes a network-accessible processor-enabled filter manager 20 used for controlling use of a computing device 12. The operation of the filter manager 20 is described herein with respect to the devices 12, 16. One skilled in the art will recognize that the filter manager 20 can operate with other suitable wired or wireless network-connectable computing systems. The filter manager 20 includes an artificial neural network engine 22, an artificial neural network datastore 24, a user datastore 26, a settings application program interface ("API") 28, a filter application program interface ("API"), and a telecommunication carrier ("telecom") interface 32. The filter manager 20 can be implemented on one or more network-connectable processor-enabled computing systems, for example in a peer-to-peer configuration, and need not be implemented on a single system at a single location. The filter manager 20 is configured for communication via the communications network 8 with other network-connectable computing systems including the computing device 12, user device 16, and a telecommunication carrier system implementing an API ("Telecom API") 80 enabled for controlling communications of the computing device 12. Alternatively, the filter manager 20 or one or more components thereof can be executed on the computing device 12 or other system. A settings application 40 is provided on the user device 16. The settings application 40 can include a downloadable software application specially configured for interface with the settings API 28 to communicate filter settings to the filter manager via the settings API 28. Alternatively, the settings application 40 can include a generic web browser or other application allowing a user of the user device 16 to communicate filter settings to the filter manager 20 via the settings API 28.

Figure 6:
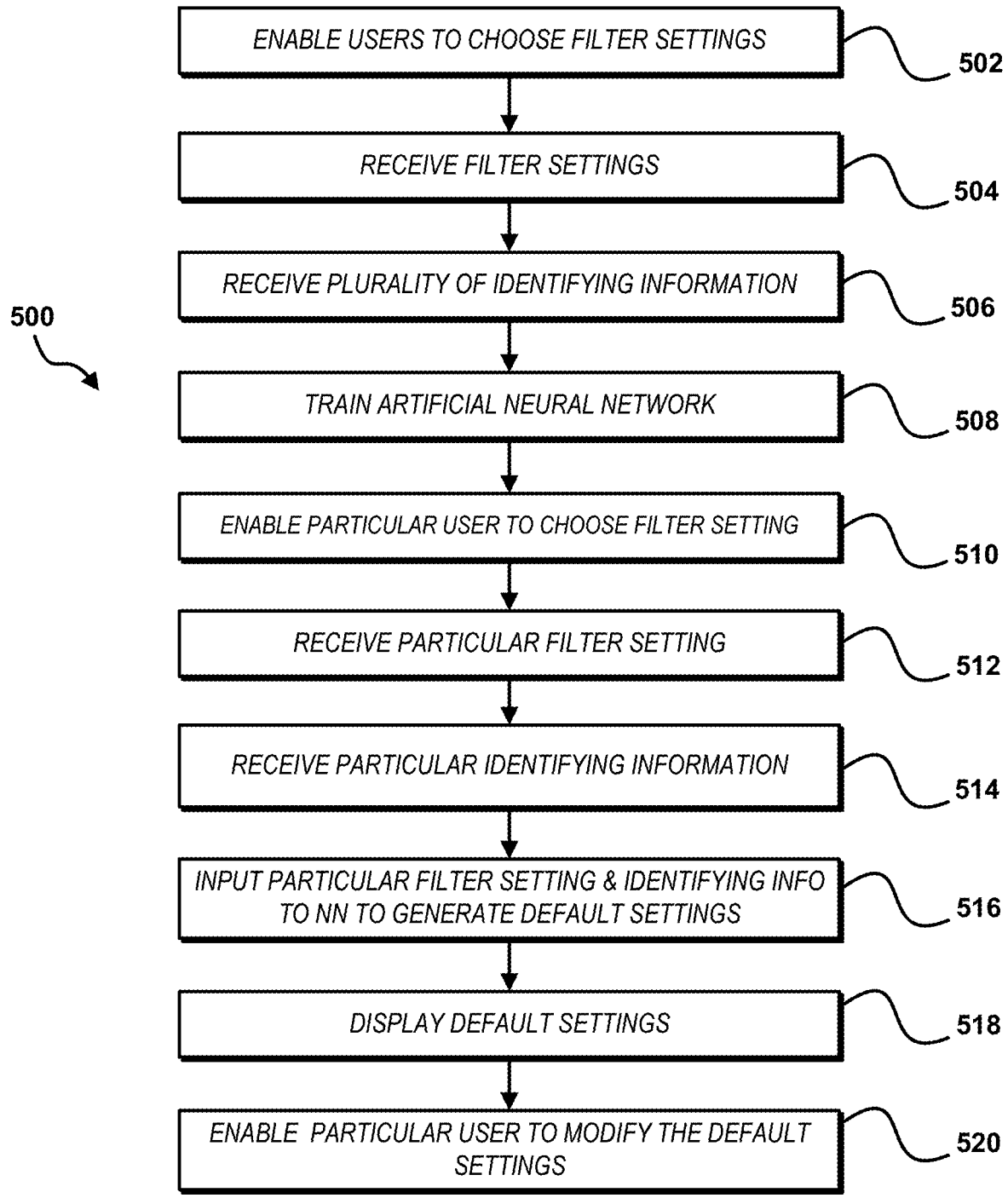
FIG. 6 is a flow chart showing a default filter setting method according to an illustrative embodiment.

Referring to FIG. 6, a flowchart shows a content filter setting method 500. While the method 500 and associated processes are described with reference to the components of the system 10 shown in FIG. 1, including the computing device 12, the user device 16, the network-accessible processor-enabled filter manager 20, and the settings application 40, the method 500 may alternatively be performed via other suitable systems.

Figure 2C:
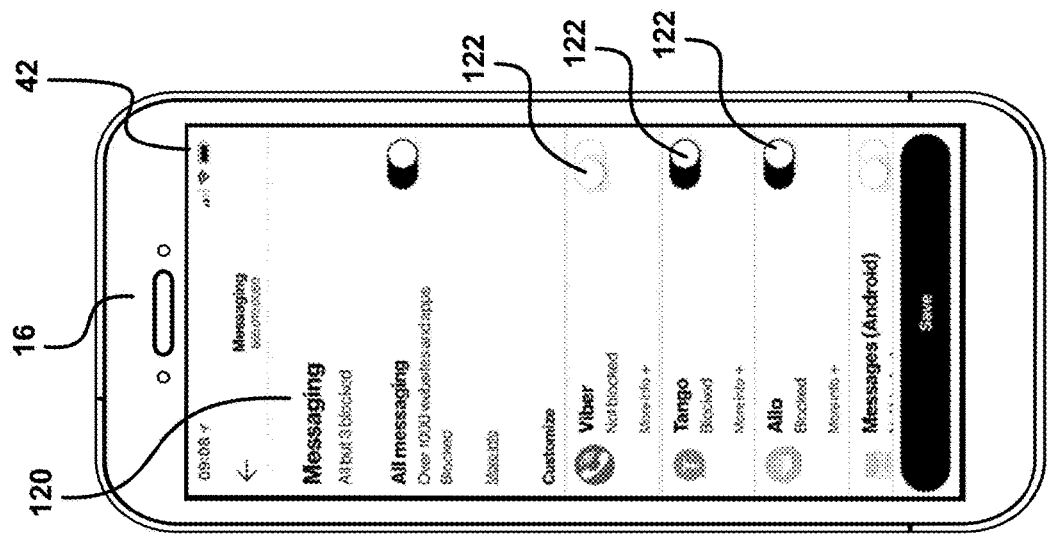
Figure 2B:
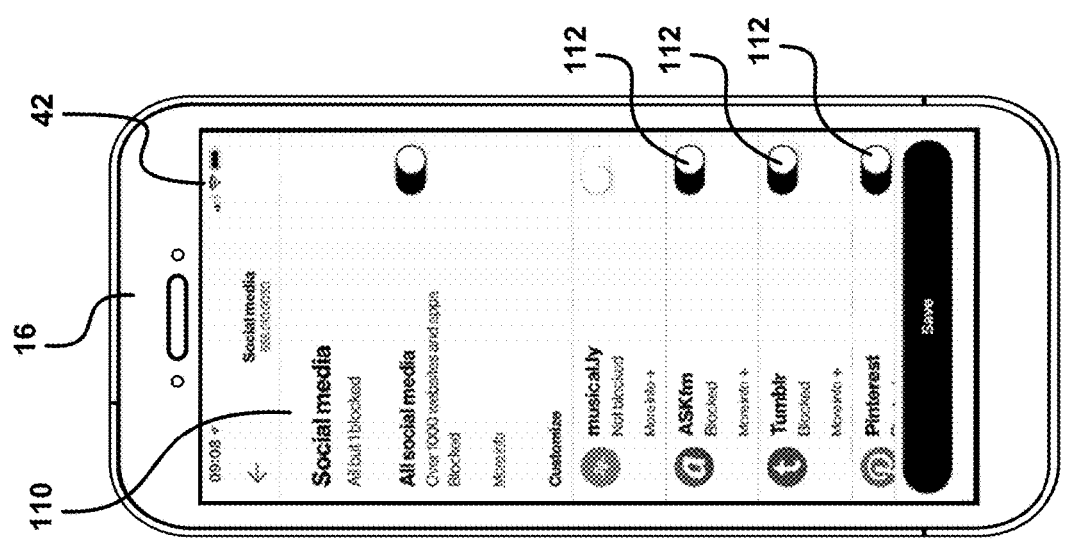
Figure 2A:
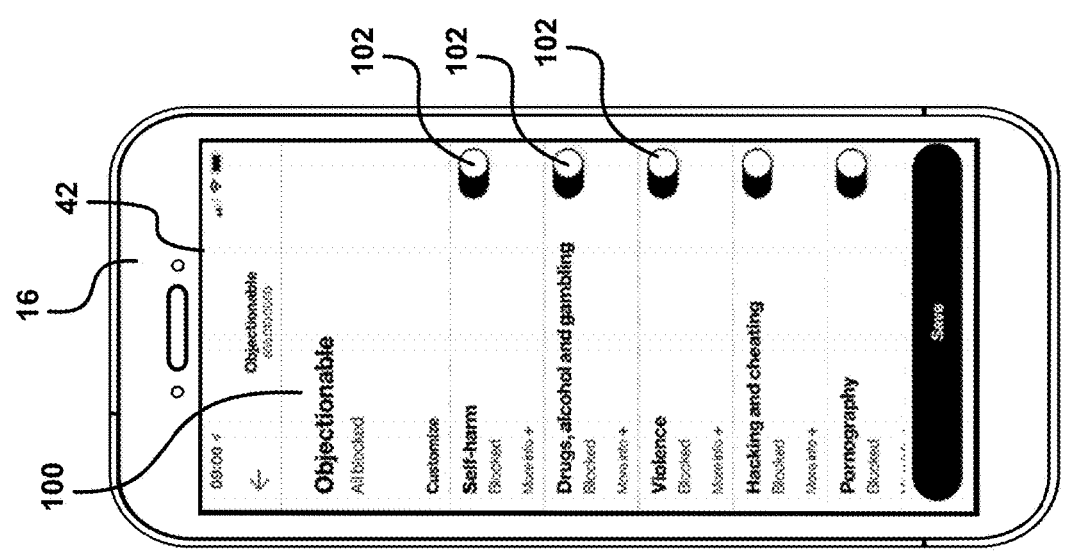

In a step 502, a plurality of users choose a plurality of filter settings of a plurality of filters of a particular application. The settings application 40 enables users of the user device 16 to make choices via the settings API 28. FIGS. 2A, 2B, and 2C show exemplary filters enabled by the settings API 28 from which the users via the settings application 40 can choose the filter setting of "blocked" or "unblocked". FIG. 2A shows exemplary content including "self-harm" content, "[illicit] drugs, alcohol, and gambling" content, "violence" content, "hacking and cheating" content, and "pornography" content, which can be blocked on the computing device 12 by the filter agent 14 from messaging applications 50, social media applications 52, and browsers 54, for example using keyword recognition, key phrase recognition, image recognition, website blacklisting, application blacklisting, or user blacklisting. Blocking can alternatively be implemented at a network level by a telecommunication carrier system for example through instructions provided by the telecom interface 32 of the filter manager 20 via the telecom API 80. FIG. 2B shows names of exemplary social media applications 52 which a user can choose to block or not block via the settings application 40, and FIG. 2C shows names of exemplary messaging applications 50 a user can choose to block or unblock via the settings application 40. The filter agent 14 on the computing device 12 can block the download or execution of blocked applications via instructions to the operating system 58 and provide notification of blocking activities to a user of the computing device 12 via the user interface 56.

The plurality of filter settings are received by the filter manager 20 from the plurality of users (step 504). A user can for example actuate content slider buttons 102 in a user interface 42 enabled by the settings application 40 to select blocked or unblocked filter settings. A plurality of identifying information of the plurality of users is received by the filter manager 20 (step 506). Identifying information can be provided by the user of the user device 16 by a questionnaire enabled by the settings application 40 via the user interface 42. Beneficially, the filter manager 20 receives the filter settings and plurality of identifying information via the settings API 28, which data is stored in the user datastore 26. Alternatively, permissions provided by the user enable access by the filter manager 20 to the user's identifying information by querying the telecom API 80 via the telecom interface 32, which data is stored in the user datastore 26. An artificial neural network is trained at least based on the plurality of filter settings and the plurality of identifying information of the plurality of users (step 508). The neural network engine 22 performs the training based on data stored in the user datastore 26 and generates neural network data which is stored in the neural network datastore 24 based on the training.

Figure 5A:
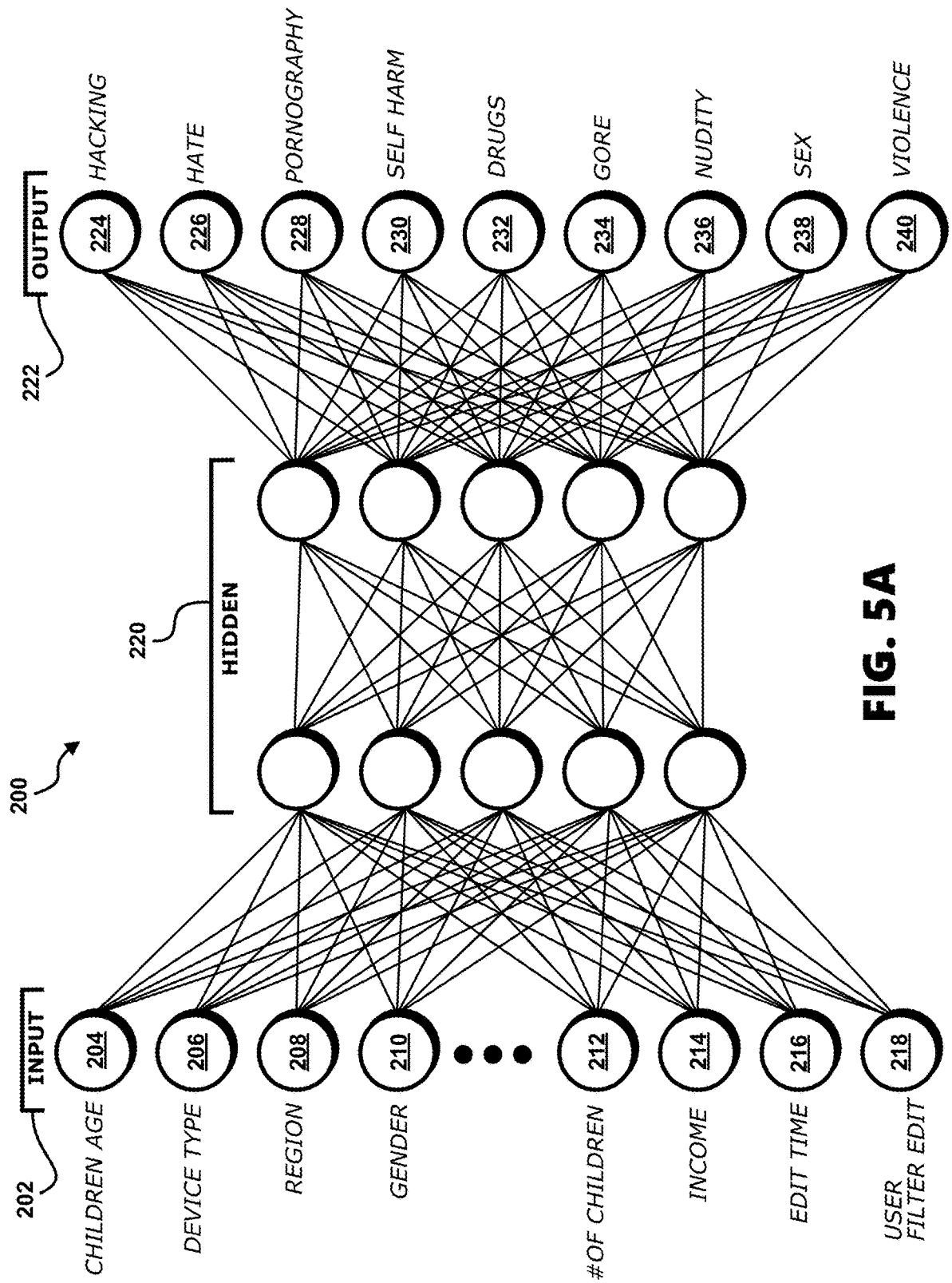

Referring to FIG. 5A, an exemplary first artificial neural network 200 is shown including an input layer 202 including identifying information of a user of the user device 16 for example an age of the user's child 204, device type and manufacturer 206, geographic region of the user 208, gender of the user 210, number of children of the user 212, and income of the user 214. Beneficially the input layer 202 can further include the time 216 it took for a user to choose the filter settings ("edit time") which can be averaged based on the number of filter settings which were edited by the user. For example, if there are 5 filter settings displayed (e.g., five content slider buttons 102 and descriptive text), and the user takes five (5) minutes to edit the filter settings and save the results, the edit time 216 can be calculated as one (1) minute per filter setting. An output layer 222 of the first artificial neural network 200 includes the plurality of filter settings received from the plurality of users including for example the blocking or unblocking of "hacking" content 224, "hate" content 226, "pornography" content 228, "self-harm" content 230, illicit "drugs" content 232, "gore" content" 234, "nudity" content 236, "sex" (i.e., sexual) content 238, and "violence" content 240. The filter settings are received for example via a first display 100 of FIG. 2A enabled by the settings application 40 of the user device 16 via the settings API 28. Beneficially at least one filter setting ("user filter edit") 218 provided by the user of the user device 16, for example the filter setting for "violence" content 240, is also used as an input of the first artificial neural network 200 to improve the predicting ability of the first artificial neural network 200. Hidden layers of nodes 220 are shown for convenience of illustration as two five node rows. Alternatively, other suitable number and arrangement of hidden nodes can be implemented. In training the first artificial neural network 200, the user identifying information 204, 206, 208, 210, 212, 214, the edit time 216, and one or more particular filter settings 218 selected by the plurality of users are provided as the input layer 202, the plurality of filter settings from the users are provided as the output layer 222, and backpropagation is beneficially employed. Alternatively, other machine learning protocols may be implemented for training the first artificial neural network 200.

Figure 5B:
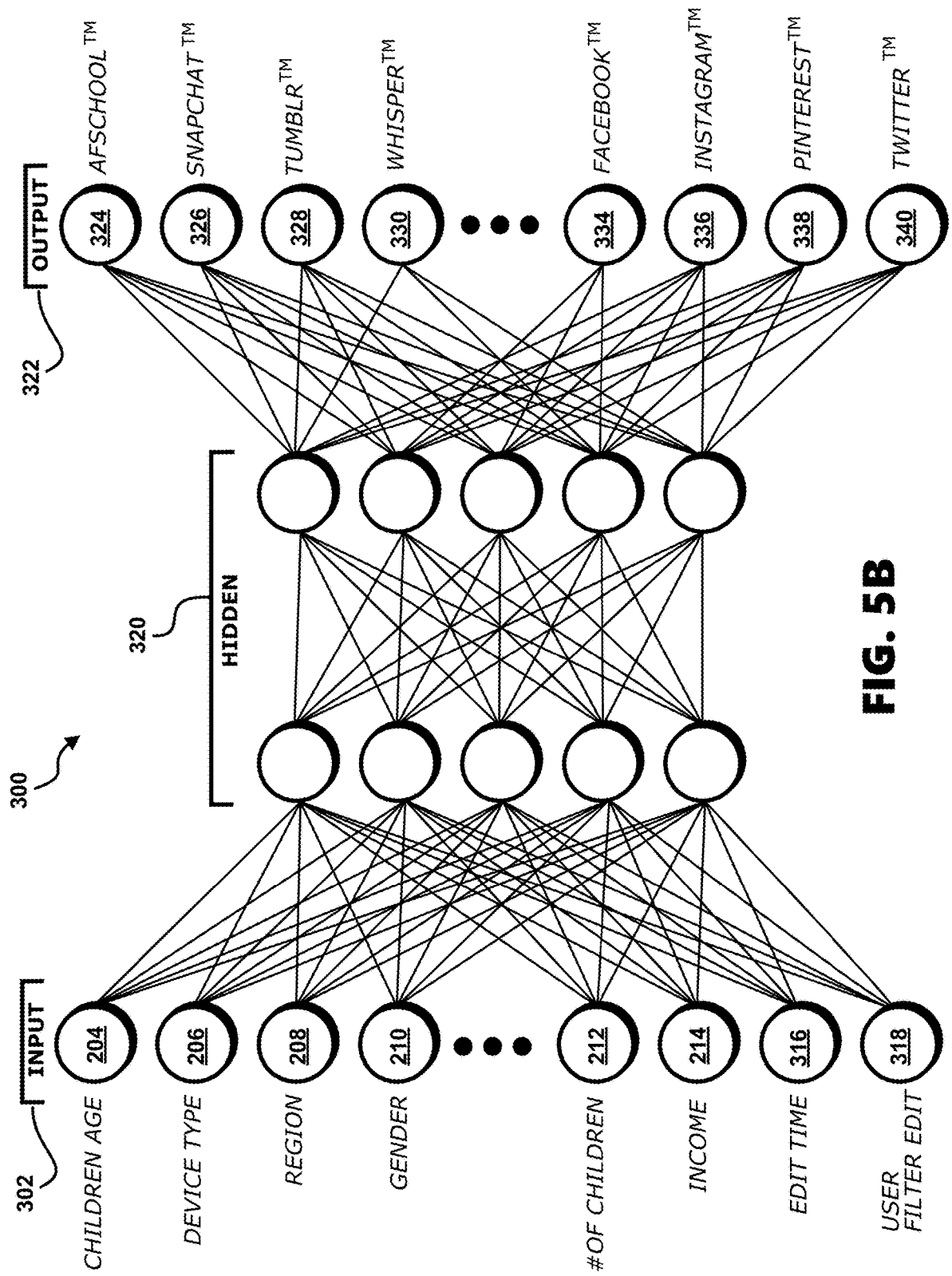

Referring to FIG. 5B, an exemplary second artificial neural network 300 is shown including an input layer 302 including the identifying information of the user of the user device 16, for example the identifying information 204, 206, 208, 210, 212, 214 described above with reference to FIG. 5A. Beneficially the input layer 302 can further include the time 316 for a user to choose the filter settings ("edit time") which can be averaged based on the number of filter settings displayed and the total time needed for the user to edit the displayed filter settings. An output layer 322 of the second artificial neural network 300 includes the plurality of filter settings received from the plurality of users including for example the blocking or unblocking of social media applications 52 including After School™ 324, Snapchat™ 326, Tumbler™ 328, Whisper™ 330, Facebook™ 334, Instagram™ 336, Pinterest™ 338, and Twitter™ 340. Referring to FIG. 2B, the filter settings are received for example via social media application slider buttons 112 in a second display 110 enabled by the settings application 40 of the user device 16 via the settings API 28. Beneficially, at least one filter setting ("filter edit") 318 provided by the user of the user device 16, for example the filter setting for Twitter™

340, is also used as an input of the second artificial neural network 300 to improve the predicting ability of the second artificial neural network 300. Hidden layers of nodes 320 are shown for convenience of illustration as two five node rows. Alternatively, other suitable number and arrangement of hidden nodes can be implemented. In training the second artificial neural network 300, the user identifying information 204, 206, 208, 210, 212, 214, the edit time 316, and one or more particular filter settings 318 selected by the plurality of users are provided as the input layer 302, the plurality of filter settings from the users are provided as the output layer 322, and backpropagation is beneficially employed. Alternatively, other machine learning protocols may be implemented for training the second artificial neural network 300.

Figure 5C:
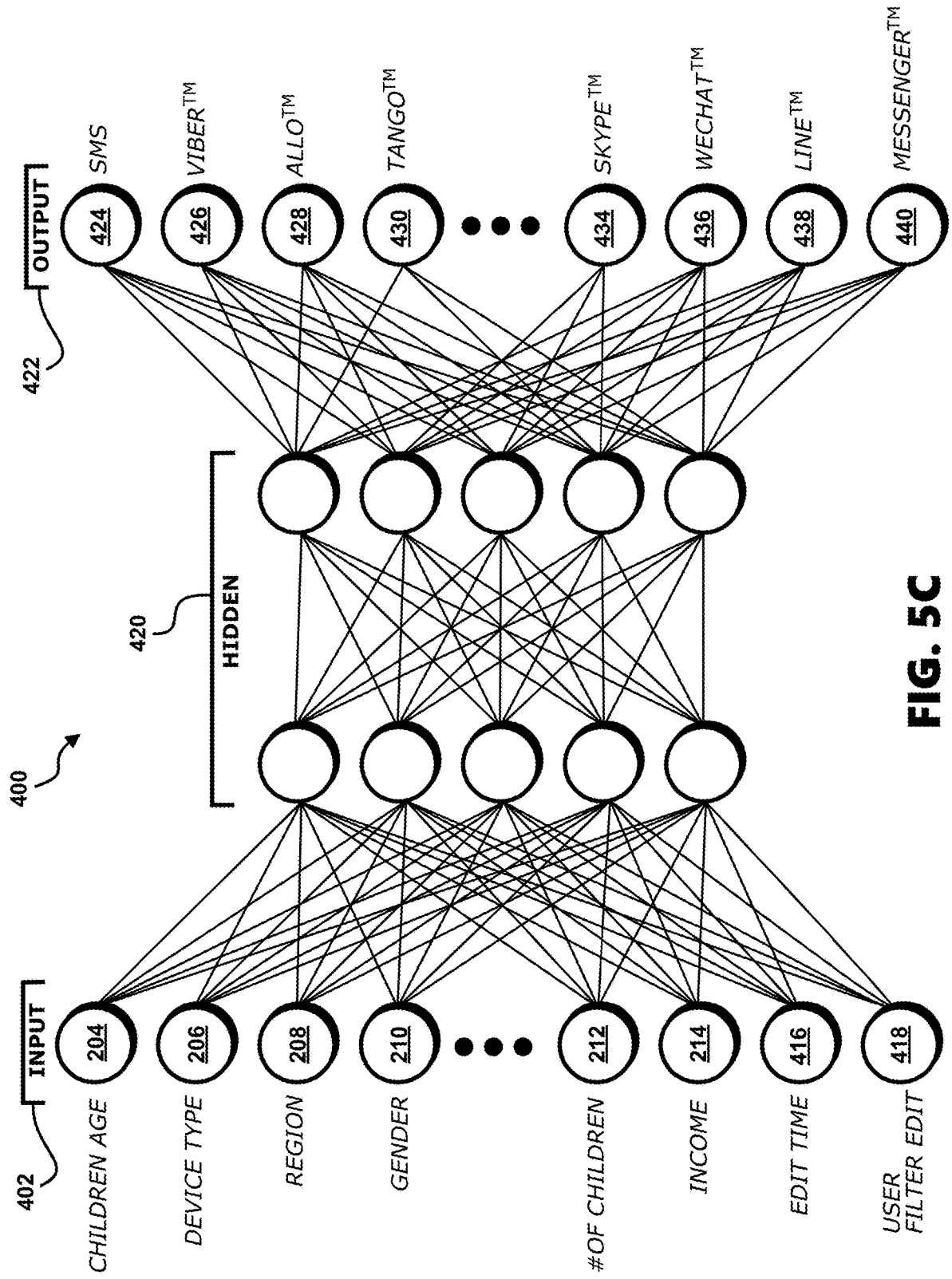

Referring to FIG. 5C, an exemplary third artificial neural network 400 is shown including an input layer 402 including the identifying information of the user of the user device 16, for example the identifying information 204, 206, 208, 210, 212, 214 described above with reference to FIG. 5A. Beneficially the input layer 402 can further include the time 416 for a user to choose the filter settings ("edit time") which can be averaged based on the number of filter settings displayed and the total time needed for the user to edit the displayed filter settings. An output layer 422 of the third artificial neural network 400 includes the plurality of filter settings received from the plurality of users including for example the blocking or unblocking of messaging applications 50 including short message service ("SMS") 424, Viber™ 426, Allo™ 428, Tango™ 430, Skype™ 434, WeChat™ 436, Line™ 438, and Messenger™ 440. Referring to FIG. 2C, the filter settings are received for example via messaging application slider buttons 122 in a third display 120 enabled by the settings application 40 of the user device 16 via the settings API 28. Beneficially at least one filter setting ("filter edit") 418 provided by the user of the user device 16, for example the filter setting for Messenger™ 440, is also used as an input of the third artificial neural network 400 to improve the predicting ability of the third artificial neural network 400. Hidden layers of nodes 420 are shown for convenience of illustration as two five node rows. Alternatively, other suitable number and arrangement of hidden nodes can be implemented. In training the third artificial neural network 400, the user identifying information 204, 206, 208, 210, 212, 214, the edit time 416, and one or more particular filter settings 418 selected by the plurality of users are provided as the input layer 402, the plurality of filter settings from the users are provided as the output layer 422, and backpropagation is beneficially employed. Alternatively, other machine learning protocols may be implemented for training the third artificial neural network 400.

When the artificial neural network is sufficiently trained with data from a plurality of users, the neural network can be used in predicting filter setting for subsequent users. In a step 510 of the method 500, a particular user is enabled to choose a particular setting of one or more particular filters of the particular application in a user interface of a particular user device 16 during an application initiation process. Referring to FIG. 3A, an exemplary fourth display 130 is enabled by the settings application 40 in the user interface 42 via the settings API 28 in which only the choice of a filter setting for a "violence" filter is enabled via a filter slider button 132. Referring to FIG. 3B, an exemplary fifth display 140 is enabled by the settings application 40 in the user interface 42 via the settings API 28 in which only the choice of a filter setting for a Twitter™ social media application is enabled via a filter slider button 142. Referring to FIG. 3C, an exemplary sixth display 150 is enabled by the settings application 40 in the user interface 42 via the settings API 28 in which only the choice of a filter setting for a Messenger™ messaging application is enabled via a filter slider button 152. The remaining filters are shown as "TBD" allowing a user to focus attention on setting the "violence" filter slider button 132, Twitter™ social media application filter slider button 142, and the Messenger™ messaging application filter slider button 152.

In a step 512 of the method 500, the particular setting of the one or more particular filters is received from the particular user via the user interface 42 of the particular user device 16. Referring to FIGS. 5A, 5B, and 5C, the particular setting is received for example as a block or unblock of the "violence" filter slider button 132, Twitter™ social media application filter slider button 142, and the Messenger™ messaging application filter slider button 152. The filter manager 20 receives the particular setting via the settings API 28 which data is stored in the user datastore 26.

The filter manager 20 further receives identifying information of the particular user (step 514), for example information received from the device 16 including device identifier (e.g., mac address, IMEI), device location (e.g., GPS location), and information obtained via a setup questionnaire administered by the settings application 40 via the settings API 28. Identifying information can also be received from the telecom API 80 via the telecom interface 32. Referring to FIG. 5A, identifying information beneficially includes an age of the particular user's child 204, device type and manufacturer 206, geographic region of the particular user 208, gender of the user 210, number of children of the user 212, and income of the user 214. In a step 516, the particular setting and the particular identifying information is input to the trained artificial neural network to generate a plurality of default settings of the plurality of filters of the particular application. The identifying information 204, 206, 208, 210, 212, and 214 is input with the user-chosen filter setting 218 indicating a block or unblock of the "violence" filter slider button 132 of FIG. 3A and the edit time information 216 to generate default settings for the blocking or unblocking of "hacking" content 224, "hate" content 226, "pornography" content 228, "self-harm" content 230, illicit "drugs" content 232, "gore" content 234, "nudity" content 236, and "sex" content 238. Edit time 216 includes the time it takes the particular user to select block or unblock using the "violence" filter slider button 132 and save the setting.

Referring to FIG. 5B for example, the identifying information 204, 206, 208, 210, 212, and 214 and edit time information 316 is input with a user-chosen filter setting 318 indicating a block or unblock of the Twitter™ social media application via a filter slider button 142 of FIG. 3B to generate default settings for the blocking or unblocking of social media applications including After School™ 324, Snapchat™ 326, Tumblr™ 328, Whisper™ 330, Facebook™ 334, Instagram™ 336, and Pinterest™ 338. Edit time 316 includes the time it takes the particular user to select block or unblock using the Twitter™ social media application filter slider button 142 and save the setting. Referring to FIG. 5C for example, the identifying information 204, 206, 208, 210, 212, and 214 and the edit time information 416 is input with the user-chosen filter setting 418 indicating a block or unblock of the Messenger™ messaging application via a filter slider button 152 of FIG. 5C to generate default settings for the blocking or unblocking of messaging applications including short message service ("SMS") applications 424, Viber™ 426, Allo™ 428, Tango™ 430, Skype™ 434, WeChat™ 436, and Line™ 438. Edit time 416 includes the time it takes the particular user to select block or unblock of the Messenger™ messaging application filter slider button 152 and save the setting.

In a step 518 of the method 500, the generated plurality of default settings are displayed in the user interface of the particular user device. Referring to FIG. 4A, an exemplary seventh display 160 is enabled by the settings application 40 in the user interface 42 via the settings API 28 in which default filter settings based on the user's identifying information, edit time, and the user's choice of "unblocked" for the "violence" filter slider button 132 are displayed. The seventh display 160 relates default settings generated by the first artificial neural network 200 in which "self-harm" content is not blocked, "drugs, alcohol and gambling" content is blocked, "hacking and cheating" content is not blocked, and "pornography" content is blocked. Referring to FIG. 4B, an exemplary eighth display 170 is enabled by the settings application 40 in the user interface 42 via the settings API 28 in which default filter settings based on the user's identifying information, edit time, and the user's choice of "blocked" for the "Twitter™" social media application filter slider button 142 are displayed. The eighth display 170 relates default settings generated by the second artificial neural network 300 in which the Musical.ly™ application is not blocked, the ASKfm™ application is blocked, the Tumblr™ application is blocked, and the Pinterest™ application is not blocked. Referring to FIG. 4C, an exemplary ninth display 180 is enabled by the settings application 40 in the user interface 42 via the settings API 28 in which default filter settings based on the user's identifying information, edit time, and the user's choice of "blocked" for the "Messenger™" messaging application slider button 152 are displayed. The ninth display 180 relates default settings generated by the third artificial neural network 400 in which the Viber™ messaging application is not blocked, the Tango™ messaging application is blocked, the Allo™ messaging application is blocked, and the Android™ messaging application is not blocked.

In a step 520, the particular user of the user device 16 is enabled to modify the default settings via the user interface 42. Referring to FIG. 4A for example, the particular user can actuate slider buttons 162 to change default settings generated via the first artificial neural network 200. When the user is satisfied with the filter settings, the user can save the filter settings via the save button 164. Referring to FIGS. 4B and 4C, the user can make changes to default settings via slider buttons 172, 182 and save the filter settings via save buttons 174, 184. The user's settings including modifications of the generated defaults are saved in the user datastore 26 of the filter manager 20. User modifications or absence of modifications to the default settings are used in further training the artificial neural networks 200, 300, 400 in the manner described above. For example in training the first artificial neural network 200, the user identifying information 204, 206, 208, 210, 212, 214, the average edit time 216 of the displayed filter settings, and one or more particular filter settings 218 (e.g., blocking or unblocking via the "violence" filter slider button 132) selected by the particular user are provided as the input layer 202. The plurality of filter settings from the particular user including modified settings and unmodified defaults are provided as the output layer 222, and backpropagation is employed.

Control settings including user-selected settings, generated default settings and any modified default settings from the particular user of the user device 16 are communicated via the filter API 30 of the filter manager 20 to the filter agent 14 on the computing device 12 operated by the supervised user, for example a child of a parent supervisory user operating the user device 16. The control settings are stored in a filter datastore 60. The filter agent 14 implements the control settings to restricting data accessible on the computing device 12 by blocking applications, communications, and media available to a user of the user devices through the messaging applications 50, social media applications 52, browsers 54, or other communication facilitating applications. For example, when stored control settings so indicate, the filter agent 14 blocks or filters communications transmitted or received through the messaging applications 50, social media applications 52, browsers 54, or other communication facilitating applications including words or phrases determined to include "hacking" content 224, "hate" content 226, "pornography" content 228, "self-harm" content 230, illicit "drugs" content 232, "gore" content 234, "nudity" content 236, "sex" content 238, and "violence" content 240. The filter agent 14 through integration with the operating system 58 further blocks execution of, uninstalls, or blocks installation of those of the messaging applications 50 and social media applications 52 which are indicated as having been blocked by a user based on stored control settings.

Referring to FIG. 21, a flowchart shows a content filter setting method 1100 according to another illustrative embodiment. While the method 1100 and associated processes are described with reference to the components of the system 10 shown in FIG. 1, including the computing device 12, the user device 16, the network-accessible processor-enabled filter manager 20, and the settings application 40, the method 1100 may alternatively be performed via other suitable systems.

In a step 1102, one or more users are enabled to choose a generic filter level of a plurality of filters of a particular application in a user interface of a user device 16 during an application initiation process. Referring to FIGS. 16A, 16B, 16C, a user can actuate generic slider buttons 902, 912, 922 in a user interface 42 in exemplary tenth, eleventh, and twelfth displays 900, 910, 920 to select "relaxed" or "conservative" filter settings in a binary decision input. Referring to FIG. 16A, the exemplary tenth display 900 is enabled by the settings application 40 in the user interface 42 via the settings API 28 in which the choice of a generic filter level is enabled via the generic slider button 902, and in which objectionable content filters are labeled "TBD" ("to be determined"). Referring to FIG. 16B, the exemplary eleventh display 910 is enabled by the settings application 40 in the user interface 42 via the settings API 28 in which the choice of a generic filter level is enabled via the generic slider button 912, and in which social media application filters are labeled "TBD" ("to be determined"). Referring to FIG. 16C, the exemplary twelfth display 920 is enabled by the settings application 40 in the user interface 42 via the settings API 28 in which the choice of a generic filter level is enabled via the generic slider button 922, and in which messaging application filters are labeled "TBD" ("to be determined").

Figure 17C:
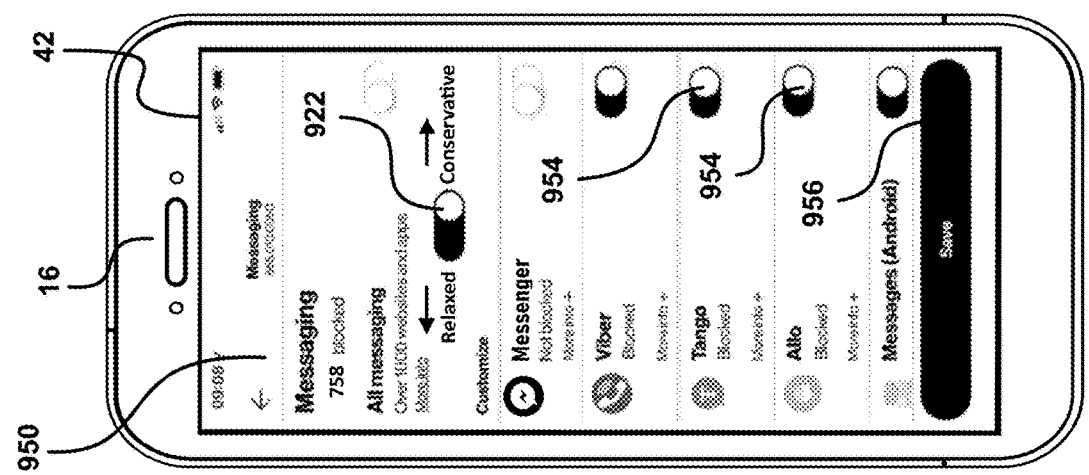

In a step 1104, the chosen filter level is used to generate via the filter agent 14 a plurality of default settings of the plurality of filters of the particular application based on an initial mapping table including a predetermined mapping of filter settings to selectable filter levels. The initial mapping table can be randomly generated or created based on particular criteria. The generated plurality of default settings are displayed in the user interface 42 of the user device 16 (step 1106). Referring to FIG. 17A, an exemplary thirteenth display 930 is enabled by the settings application 40 in the user interface 42 via the settings API 28 in which default filter settings based on the user's choice of "relaxed" for the generic slider button 902 are displayed. The thirteenth display 930 relates default settings generated by a predetermined mapping via the filter agent 14 in which "self-harm" content is blocked and "violence", "drugs, alcohol and gambling", "hacking and cheating", and "pornography" content is not blocked. Content can be blocked on the computing device 12 by the filter agent 14 from messaging applications 50, social media applications 52, and browsers 54, for example using keyword recognition, key phrase recognition, image recognition, website blacklisting, application blacklisting, or user blacklisting. Blocking can alternatively be implemented at a network level by a telecommunication carrier system for example through instructions provided by the telecom interface 32 of the filter manager 20 via the telecom API 80.

Figure 17B:
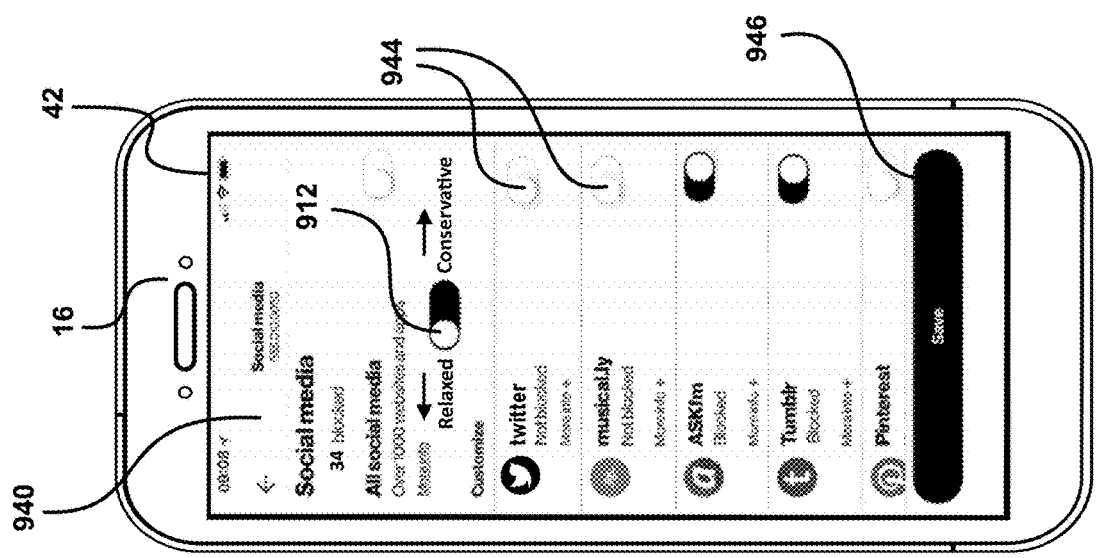
Figure 17A:
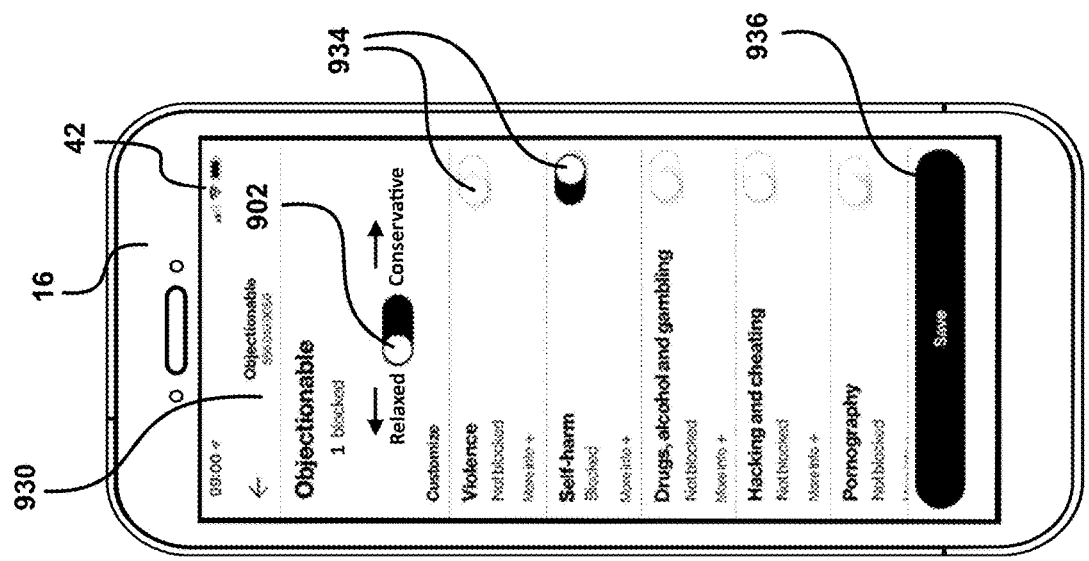

Referring to FIG. 17B, an exemplary fourteenth display 940 is enabled by the settings application 40 in the user interface 42 via the settings API 28 in which default filter settings based on the user's choice of "relaxed" for the generic slider button 912 are displayed. The fourteenth display 940 relates default settings generated by a predetermined mapping via the filter agent 14 in which the Twitter™ application is not blocked, the Musical.ly™ application is not blocked, the ASKfm™ application is blocked, the Tumblr™ application is blocked, and the Pinterest™ application is not blocked. Referring to FIG. 17C, an exemplary fifteenth display 950 is enabled by the settings application 40 in the user interface 42 via the settings API 28 in which default filter settings based on the user's choice of "conservative" for the generic slider button 922 are displayed. The fifteenth display 950 relates default settings generated by a predetermined mapping via the filter agent 14 in which the Messenger™ messaging application is not blocked, and the Viber™, Tango™, Allo™, and Android™ messaging applications are blocked. The filter agent 14 on the computing device 12 can block the download or execution of blocked applications via instructions to the operating system 58 and provide notification of blocking activities to a user of the computing device 12 via the user interface 56.

The one or more users are enabled to modify the default filter settings of the plurality of filters of the particular application (step 1108). Referring to FIG. 17A for example, the one or more users can actuate slider buttons 934 to change the default settings. When a user is satisfied with the filter settings, the user can save the filter settings via the save button 936. Referring to FIGS. 17B and 17C, the user can make changes to default settings via slider buttons 944, 954 and save the filter settings via save buttons 946, 956. Alternatively, a "detailed selection" button can be provided in a user interface to enable modification of default filter settings, for example a button that activates slider buttons 934, 944, 954.

The generic filter level (e.g., "relaxed" or "conservative") and filter settings as modified by the user are received by the filter manager 20 from the plurality of users (step 1110). Further, a plurality of identifying information of the one or more users is received by the filter manager 20 (step 1112). Identifying information can be provided by the user of the user device 16 by a questionnaire enabled by the settings application 40 via the user interface 42. Beneficially, the filter manager 20 receives the filter settings and plurality of identifying information via the settings API 28, which data is stored in the user datastore 26. Alternatively, permissions provided by the user enable access by the filter manager 20 to the user's identifying information by querying the telecom API 80 via the telecom interface 32, which data is stored in the user datastore 26. An artificial neural network is trained at least based on the generic filter levels, the plurality of filter settings, and the plurality of identifying information of the plurality of users (step 1114). Beneficially, training is performed based on data from users who both choose a generic filter level (e.g., "relaxed" or "conservative") and modify one or more default filter settings, or enable modification of default filter settings for example via a "detailed selection" button in a user interface, but excluding data from users who only choose a generic filter level and do not modify or enable modification of the filter settings. The neural network engine 22 performs the training based on data stored in the user datastore 26. Based on the training, the neural network engine 22 generates neural network data used to update the mapping table which is stored with the neural network data in the neural network datastore 24 for use with subsequent users.

Referring to FIG. 20A, an exemplary fourth artificial neural network 1200 is shown including an input layer 1202 including identifying information of a user of the user device 16 for example an age of the user's child 204, device type and manufacturer 206, geographic region of the user 208, gender of the user 210, number of children of the user 212, and income of the user 214. Beneficially the input layer 1202 can further include the time 1216 it took for a user to choose the generic filter level and the filter settings ("edit time") which can be averaged based on the number of filter settings which were edited by the user. For example, if there are 5 buttons displayed (e.g., the generic slider button 922 and four content slider buttons 934 and descriptive text), and the user takes five (5) minutes to edit the filter level and filter settings and save the results, the edit time 1216 can be calculated as one (1) minute per setting. The user-chosen generic filter level ("user generic setting edit") 1218 provided by the user of the user device 16 is also used as an input of the fourth artificial neural network 1200. An output layer 1222 of the fourth artificial neural network 1200 includes the plurality of filter settings received from the one or more users including for example the blocking or unblocking of "hacking" content 224, "hate" content 226, "pornography" content 228, "self-harm" content 230, illicit "drugs" content 232, "gore" content 234, "nudity" content 236, "sex" (i.e., sexual) content 238, and "violence" content 240. The filter settings are received for example via the thirteenth display 930 of FIG. 17A enabled by the settings application 40 of the user device 16 via the settings API 28. The user-chosen generic filter level ("user generic setting edit") 1218 provided by the user of the user device 16 is also used as an input of the fourth artificial neural network 1200. Hidden layers of nodes 1220 are shown for convenience of illustration as two five node rows. Alternatively, other suitable number and arrangement of hidden nodes can be implemented. In training the fourth artificial neural network 1200, the user identifying information 204, 206, 208, 210, 212, 214, the edit time 1216, and the generic setting edit 1218 selected by the one or more users are provided as the input layer 1202, the plurality of filter settings from the users are provided as the output layer 1222, and backpropagation is beneficially employed. Alternatively, other machine learning protocols may be implemented for training the fourth artificial neural network 1200.

Referring to FIG. 20B, an exemplary fifth artificial neural network 1300 is shown including an input layer 1302 including the identifying information of the user of the user device 16, for example the identifying information 204, 206, 208, 210, 212, 214 described above with reference to FIG. 20A. Beneficially the input layer 1302 can further include the time 1316 for a user to choose the generic filter level and the filter settings ("edit time") which can be averaged based on the number of filter settings which were edited by the user. The user-chosen generic filter level ("user generic setting edit") 1318 provided by the user of the user device 16 is also used as an input of the fifth artificial neural network 1300. An output layer 1322 of the fifth artificial neural network 300 includes the plurality of filter settings received from the one or more users including for example the blocking or unblocking of social media applications 52 including After School™ 324, Snapchat™ 326, Tumbler™ 328, Whisper™ 330, Facebook™ 334, Instagram™ 336, Pinterest™ 338, and Twitter™ 340. Referring to FIG. 17B, the filter settings are received for example via social media application slider buttons 944 in a fourteenth display 940 enabled by the settings application 40 of the user device 16 via the settings API 28. Hidden layers of nodes 1320 are shown for convenience of illustration as two five node rows. Alternatively, other suitable number and arrangement of hidden nodes can be implemented. In training the fifth artificial neural network 1300, the user identifying information 204, 206, 208, 210, 212, 214, the edit time 1316, and the generic setting edit 1318 selected by the one or more users are provided as the input layer 1302, the plurality of filter settings from the users are provided as the output layer 1322, and backpropagation is beneficially employed. Alternatively, other machine learning protocols may be implemented for training the fifth artificial neural network 1300.

Referring to FIG. 20C, an exemplary sixth artificial neural network 1400 is shown including an input layer 1402 including the identifying information of the user of the user device 16, for example the identifying information 204, 206, 208, 210, 212, 214 described above with reference to FIG. 20A. Beneficially the input layer 1402 can further include the time 1416 for a user to choose the generic filter level and the filter settings ("edit time") which can be averaged based on the number of filter settings which were edited by the user. The user-chosen generic filter level ("user generic setting edit") 1418 provided by the user of the user device 16 is also used as an input of the sixth artificial neural network 1400. An output layer 1422 of the sixth artificial neural network 1400 includes the plurality of filter settings received from the one or more users including for example the blocking or unblocking of messaging applications 50 including short message service ("SMS") 424, Viber™ 426, Allo™ 428, Tango™ 430, Skype™ 434, WeChat™ 436, Line™ 438, and Messenger™ 440. Referring to FIG. 17C, the filter settings are received for example via messaging application slider buttons 954 in a fifteenth display 950 enabled by the settings application 40 of the user device 16 via the settings API 28. Hidden layers of nodes 1420 are shown for convenience of illustration as two five node rows. Alternatively, other suitable number and arrangement of hidden nodes can be implemented. In training the sixth artificial neural network 1400, the user identifying information 204, 206, 208, 210, 212, 214, the edit time 1416, and the generic setting edit 1418 selected by the one or more users are provided as the input layer 1402, the plurality of filter settings from the users are provided as the output layer 1422, and backpropagation is beneficially employed. Alternatively, other machine learning protocols may be implemented for training the sixth artificial neural network 1400.

When the artificial neural network is trained with data from one or more users, the neural network can be used in predicting filter setting for subsequent users. In a step 1116 of the method 1100, a particular user is enabled to choose a generic filter level of a plurality of filters of the particular application in a user interface of a user device 16 during an application initiation process. Referring again to FIG. 16A, the exemplary tenth display 900 is enabled by the settings application 40 in the user interface 42 via the settings API 28 in which the choice of the generic filter level filter is enabled via the generic slider button 902, and in which objectionable content filters are labeled "TBD" ("to be determined"). Referring again to FIG. 16B, the exemplary eleventh display 910 is enabled by the settings application 40 in the user interface 42 via the settings API 28 in which the choice of the generic filter level filter is enabled via the generic slider button 912, and in which the social media application filters are labeled "TBD" ("to be determined"). Referring again to FIG. 16C, the exemplary twelfth display 920 is enabled by the settings application 40 in the user interface 42 via the settings API 28 in which the choice of the generic filter level filter is enabled via the generic slider button 922, and in which messaging application filters are labeled "TBD" ("to be determined").

In a step 1118 of the method 1100, the user-chosen generic filter level ("user generic setting edit") 1218 is received from the particular user via the user interface 42 of the particular user device 16. Referring to FIGS. 16A, 16B, and 16C, the generic filter level is received for example as "relaxed" or "conservative" via generic slider buttons 902, 912, 922. The filter manager 20 receives the filter level via the settings API 28 which data is stored in the user datastore 26.

The filter manager 20 further receives identifying information of the particular user (step 1120), for example information received from the device 16 including device identifier (e.g., mac address, IMEI), device location (e.g., GPS location), and information obtained via a setup questionnaire administered by the settings application 40 via the settings API 28. Identifying information can also be received from the telecom API 80 via the telecom interface 32. Referring to FIG. 20A, identifying information beneficially includes an age of the particular user's child 204, device type and manufacturer 206, geographic region of the particular user 208, gender of the user 210, number of children of the user 212, and income of the user 214. In a step 1122, the user-chosen generic filter level and the particular identifying information is input to the trained artificial neural network to generate a plurality of default settings of the plurality of filters of the particular application. The identifying information 204, 206, 208, 210, 212, and 214 is input with the user-chosen generic filter level ("user generic setting edit") 1218, indicating "relaxed" or "conservative" actuation of the generic slider button 902, and the edit time information 1216 to generate default settings for the blocking or unblocking of "hacking" content 224, "hate" content 226, "pornography" content 228, "self-harm" content 230, illicit "drugs" content 232, "gore" content 234, "nudity" content 236, "sex" content 238, and "violence" content 240. Edit time 1216 includes the time it takes the particular user to select "relaxed" or "conservative" via actuation of the generic slider buttons 902, 912, 922 and save the setting.

Referring to FIG. 20B for example, the identifying information 204, 206, 208, 210, 212, and 214 and edit time information 1316 is input with a user-chosen generic filter level ("user generic setting edit") 1318, indicating a "relaxed" or "conservative" actuation of the generic slider button 912, to generate default settings for the blocking or unblocking of social media applications including After School™ 324, Snapchat™ 326, Tumblr™ 328, Whisper™ 330, Facebook™ 334, Instagram™ 336, and Pinterest™ 338. Edit time 1316 includes the time it takes the particular user to select "relaxed" or "conservative" via actuation of the generic slider button 912 and save the setting. Referring to FIG. 20C for example, the identifying information 204, 206, 208, 210, 212, and 214 and the edit time information 1416 is input with a user-chosen generic filter level ("user generic setting edit") 1418, indicating a "relaxed" or "conservative" actuation of the generic slider button 922, to generate default settings for the blocking or unblocking of messaging applications including short message service ("SMS") applications 424, Viber™ 426, Allo™ 428, Tango™ 430, Skype™ 434, WeChat™ 436, and Line™ 438. Edit time 1416 includes the time it takes the particular user to select "relaxed" or "conservative" via actuation of the generic slider button 922 and save the setting.

In a step 1124 of the method 1100, the generated plurality of default settings are displayed in the user interface 42 of the particular user device 16, for example in the manner shown in the exemplary thirteenth display 930, fourteenth display 940, and fifteenth display 950 of FIGS. 17A, 17B, and 17C as described above with respect to steps 1104 and 1106.

The particular user is enabled to modify the default filter settings of the plurality of filters of the particular application (step 1126). Referring to FIG. 17A for example, the particular user can actuate slider buttons 934 to change the default settings. When the particular user is satisfied with the filter settings, the user can save the filter settings via the save button 936. Referring to FIGS. 17B and 17C, the user can make changes to default settings via slider buttons 944, 954 and save the filter settings via save buttons 946, 956. The user's settings including modifications of the generated defaults are saved in the user datastore 26 of the filter manager 20. The method 1100 returns to step 1114, and user modifications or absence of modifications to the default settings are used in further training the artificial neural networks 1200, 1300, 1400 in the manner described above with reference to FIGS. 20A, 20B, and 20C. For example in training the fourth artificial neural network 1200, the user identifying information 204, 206, 208, 210, 212, 214, the average edit time 1216, and user-chosen generic filter level ("user generic setting edit") 1218 (e.g., "relaxed" or "conservative" selection of the generic slider button 902) selected by the particular user are provided as the input layer 1202. The plurality of filter settings from the particular user including modified settings and unmodified defaults are provided as the output layer 1222, and backpropagation is employed.

As an alternative to a binary input decision (e.g., "relaxed"/"conservative") such as enabled by generic slider buttons 902, 912, 922, a generic filter level selection can be enabled with multiple selections or in an analog scale from maximum or "most conservative" to minimum or "least conservative". For example, multiple selections (e.g., 1-5 levels) or a substantially continuous range (e.g., 0%-100%) of inputs can be enabled in a user interface for a user to set a generic filter level. A slide bar or dial enabled in a user interface fan be color coded to illustrate the degree of conservatism in the generic filter level selection (e.g., red is most conservative, green is least conservative, and yellow is in the middle). To permit intuitive user selection, a user can be enabled to scroll a slide bar or turn a dial in a user interface, the filter agent 14 can list one or more blocked or allowed categories in real-time based on the current position of such slide bar or dial, for example based on real-time outputs of the artificial neural networks 1200, 1300, 1400. When the selection via the slide bar, dial or other input is confirmed or saved by the user, any remaining non-displayed categories or filters can be set based on a predetermined mapping of filter settings or based outputs of the artificial neural networks 1200, 1300, 1400 in the manner described above with reference to step 1104 or step 1124 of the method 1100.

Referring to FIGS. 18A, 18B, and 18C, exemplary sixteenth display 1000, seventeenth display 1010, and eighteenth display 1020 in a user interface 42 enabled by the settings application 40 allow a user to actuate generic slider buttons 1002, 1012, 1022 to select "relaxed" or "conservative" filter settings based on a scale between one through five. The displays 1000, 1010, 1020 can be used for example in performing the steps 1102 and 1116 of the method 1100 as described above. Referring to FIGS. 19A, 19B, and 19C, exemplary nineteenth display 1030, twentieth display 1040, and twenty-first display 1050 are enabled by the settings application 40 in the user interface 42 via the settings API 28 in which default filter settings based on the user's choices using the generic slider buttons 1002, 1012, 1022 are displayed. The displays 1030, 1040, 1050 can be used for example in performing the steps 1106 and 1124 of the method 1100 as described above. Slider buttons 1034, 1044, 1054 enable users to modify default settings, for example for use in performing steps 1108 and 1126 of the method 1100, and save buttons 1036, 1046, 1056 permit saving of settings.

The methods 500 and 1100, described above respectively with reference to exemplary first, second, and third artificial neural networks 200, 300, 400 and exemplary fourth, fifth, and sixth artificial neural networks 1200, 1300, 1400, are effective at streamlining an application initiation process. The corresponding exemplary displays described above enable a one button solution which limits required display screen area and minimizes user inputs to decrease use of system resources including communication bandwidth, processing resources, and graphic resources thereby limiting device power requirements. The methods 500 and 1100 are particularly useful for facilitating application initiation on mobile handheld devices which have limited display screen area and limited battery power storage.

FIG. 8 illustrates in abstract the function of an exemplary computer system 800 on which the systems, methods and processes described herein can execute. For example, the computing device 12, user device 16, filter manager 20, and telecom API 80 can each be embodied by a particular computer system 800. The computer system 800 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 824 executable by the computer system 800.

The computer system 800 can operate as a standalone device or can be connected (e.g., networked) to other machines. In a networked deployment, the computer system 800 may operate in the capacity of a server or a client machine in server-client network environment, or as a peer machine in a peer-to-peer (or distributed) network environment. The computer system 800 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 800 includes a processor 802, for example a central processing unit (CPU) or a graphics processing unit (GPU), a main memory 804, and a static memory 806 in communication via a bus 808. A visual display 810 for example a liquid crystal display (LCD), light emitting diode (LED) display or a cathode ray tube (CRT) is provided for displaying data to a user of the system. The visual display 810 can be enabled to receive data input from a user for example via a resistive or capacitive touch screen. A character input apparatus 812 can be provided for example in the form of a physical keyboard, or alternatively, a program module which enables a user interactive simulated keyboard on the visual display 810 and actuatable for example using a resistive or capacitive touchscreen. An audio input apparatus 813, for example a microphone, enables audible language input which can be converted to textual input by the processor 802 via the instructions 824. A pointing/selecting apparatus 814 can be provided, for example in the form of a computer mouse or enabled via a resistive or capacitive touch screen in the visual display 810. A data drive 816, a signal generator 818 such as an audio speaker, and a network interface 820 can also be provided. A location determining system 817 is also provided which can include for example a GPS receiver and supporting hardware.

The instructions 824 and data structures embodying or used by the herein-described systems, methods, and processes, for example software instructions, are stored on a computer-readable medium 822 and are accessible via the data drive 816. Further, the instructions 824 can completely or partially reside for a particular time period in the main memory 804 or within the processor 802 when the instructions 824 are executed. The main memory 804 and the processor 802 are also as such considered computer-readable media.

While the computer-readable medium 822 is shown as a single medium, the computer-readable medium 822 can be considered to include a single medium or multiple media, for example in a centralized or distributed database, or associated caches and servers, that store the instructions 824. The computer-readable medium 822 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, and CD-ROM and DVD-ROM disks, Erasable Programmable Read-Only Memory (EPROM), Electrically Erasable Programmable Read-Only Memory (EEPROM), and flash memory devices).

The instructions 824 can be transmitted or received over a communications network, for example the communications network 8, using a signal transmission medium via the network interface 820 operating under one or more known transfer protocols for example, FTP, HTTP, or HTTPs. Examples of communication networks include a local area network (LAN), a wide area network (WAN), the Internet, mobile telephone networks, Plain Old Telephone (POTS) networks, and wireless data networks, for example WiFi™ and 3G/4G/5G cellular networks. The term "computer-readable signal medium" can further be considered to include any transitory intangible medium that is capable of storing, encoding, or carrying instructions for execution by a machine, and includes digital or analog communications signals or other intangible medium to facilitate communication of such instructions.

EXAMPLES

Example 1

Figure 7A:
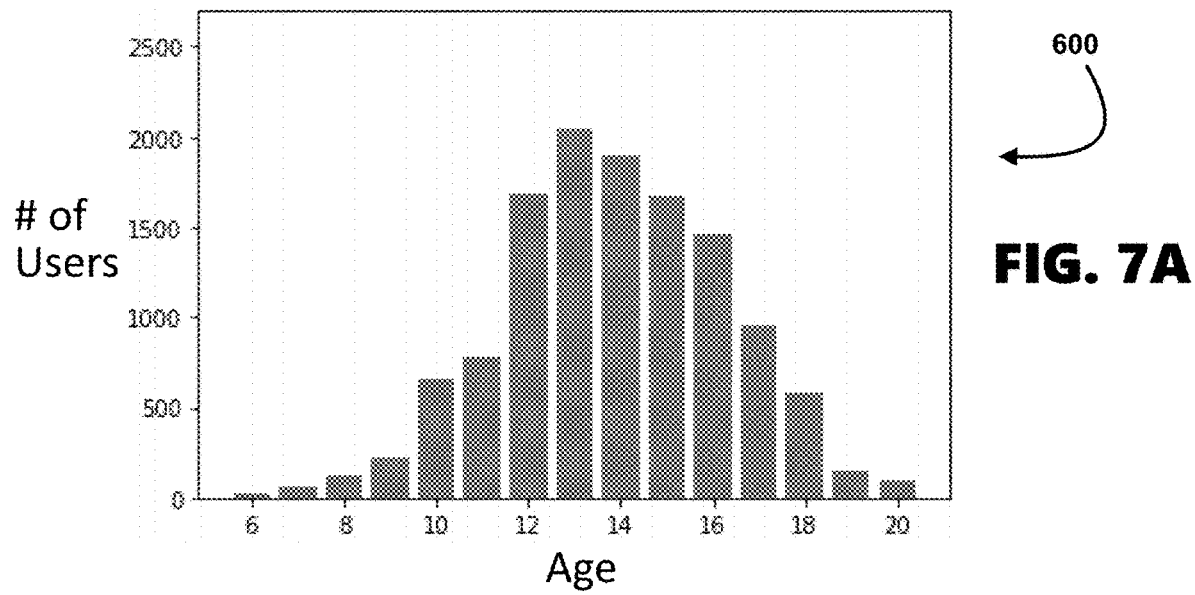
FIGS. 7A and 7B are bar charts showing age distributions of users of controlled devices in an exemplary implementation of an artificial neural network for setting device control filters.

A total of 14,028 supervising users (e.g., parents) of 14,028 supervised users (e.g., children of the parents) each entered the age of their corresponding supervised user and interacted with filters displayed via the settings application 40 and settings API 28. During the interaction the supervising users were enabled to modify predetermined default filter settings for "objectionable" content in a user interface of their devices, the filter settings presented in the manner shown in the first display 100 of FIG. 2A, and the filters including in part "self-harm", "drugs, alcohol and gambling", "violence", "hacking and cheating", and "pornography" filters. The predetermined default filter settings were generated based only on a user-indicated age of the supervised user whose device was to be content-filtered, not based on any machine learning algorithm. Using the terminology and reference numerals set forth in FIG. 5A, the filters displayed enabled users to choose between the blocking or unblocking of "hacking" (i.e. "hacking and cheating") content 224, "hate" content 226, "pornography" content 228, "self-harm" content 230, illicit "drugs" (i.e. "drugs, alcohol and gambling") content 232, "gore" content 234, "nudity" content 236, "sex" (i.e., "sexual") content 238, and "violence" content 240. Referring to FIG. 7A, a first age distribution chart 600 shows the number of the 14,028 supervised users of particular ages corresponding to those of the 14,028 supervising users who edited one or more of the "objectionable" content default filter settings. Supervised users aged twelve (12) to seventeen (17) years are 69.3% of the 14,028 supervised users.

A trial artificial neural network generally of the type shown figuratively in FIG. 5A, though not with the same configuration or number of nodes, was trained in three separate manners with the filter settings chosen by, or left as default by, the supervising users used as the desired outputs. In a first training, a first dataset was input to the neural network including age of the supervising user's child 204, device type and manufacturer 206, and geographic region of the supervising user 208. In a second training, a second dataset was input to the neural network including the inputs of the first training plus gender of supervising user 210, number of children of the supervising user 212, income of supervising user 214 (estimated based on zip code of the supervising user), and the time 216 for the supervising user to choose the filter settings (i.e. "edit time"). In a third training, a third dataset was input to the neural network including the inputs of the first and second trainings plus one filter setting ("filter edit") 218 provided by the supervising user of the user device 16, wherein the filter setting 218 was the filter setting for "violence" content 240. An accuracy of the neural network as trained by the first training was determined for each filter setting by re-inputting the first input dataset to the neural network as trained by the first training and comparing the generated output with the actual filter settings chosen by the user. An accuracy of the neural network as trained by the second training was determined for each filter setting by re-inputting the second input dataset to the neural network as trained by the second training and comparing the generated output with the actual filter settings chosen by the user. An accuracy of the neural network as trained by the third training was determined for each filter setting by re-inputting the third input dataset to the neural network as trained by the third training and comparing the generated output with the actual filter settings chosen by the user. Accuracy is defined for a particular filter setting as the average number of correct filter predictions (i.e. the user's chosen filter setting was the same as the neural network output) divided by the total number of predictions by the neural network for that filter setting.

Referring to FIGS. 5A, 8A and 8B, accuracy of the neural network as trained by the first training using the first input dataset ("NN-Age, Region, Phone Type"), as trained by the second training using the second input dataset ("NN-All Features"), and as trained by the third training using the third input dataset ("NN-Violence as Extra Input") and accuracy of the pre-determined default settings are plotted in a chart 610 against filters for "hacking" (i.e. "hacking and cheating") content 224, "hate" content 226, "pornography" content 228, "self-harm" content 230, illicit "drugs" (i.e. "drugs, alcohol and gambling") content 232, "gore" content 234, "nudity" content 236, "sex" (i.e., "sexual") content 238, and "violence" content 240. The chart 610 and the key 612 of the chart 610 show that inputting the third input dataset to the neural network including the filter setting for violence content 240 results in outputs for illicit "drugs" content 232, "gore" content 234, "nudity" content 236, and "sexual" content 238 that are significantly higher in predictive accuracy than outputs resulting from input of the first and second input datasets and higher in predictive accuracy than the pre-determined default settings. In inputting the third dataset, the input filter setting 218 is the same as the known output filter setting for "violence" content 240, and accordingly the accuracy is by definition 1.0 (i.e. 100%) for the violence content for "NN-Violence as Extra Input" as shown in the chart 610. The chart 610 further shows that inputs of the first, second, and third input datasets to the neural network results in outputs for "hacking" (i.e. "hacking and cheating") content 224, "hate" content 226, "pornography" content 228, and "self-harm" content 230 that are roughly equal in predictive accuracy to the pre-determined default settings. The data plotted in FIG. 8A suggests a process in which the supervising user (e.g., a parent) is first enabled to choose a filter setting for one objectionable content category, (e.g., violence), and then in which default settings are generated from the neural network for remaining categories, results in default settings which accurately predict the user's actual desired filter settings thereby speeding up the application initialization process.

Figure 9A:
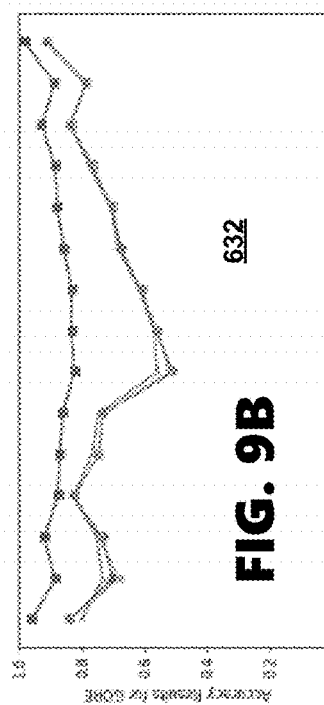
FIGS. 9A-9F are line charts and a chart key showing accuracy of predicted filter settings by age of test users in an implementation of a trial artificial neural network for setting device control filters.
Figure 9B:
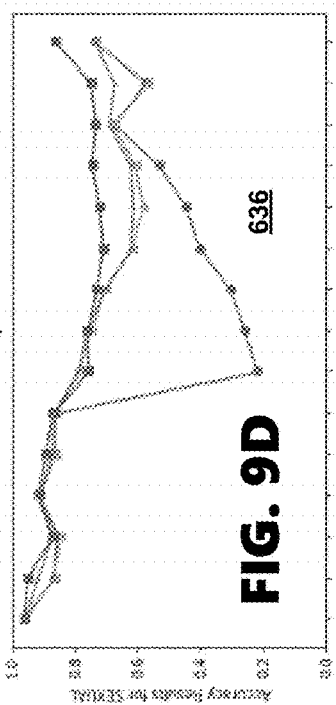
Figure 9F:
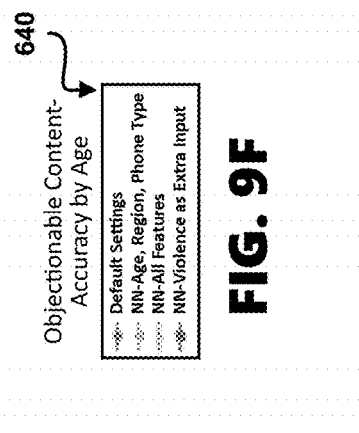
Figure 9C:
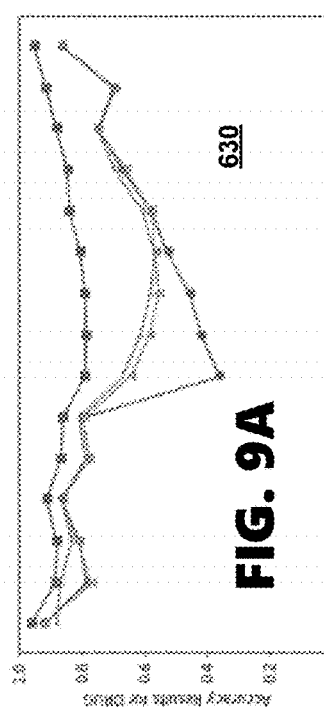
Figure 9D:
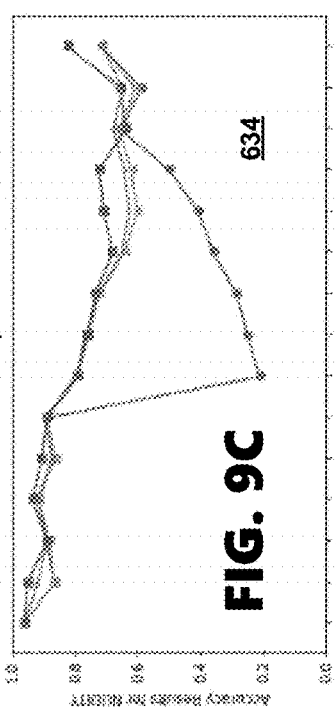
Figure 9E:
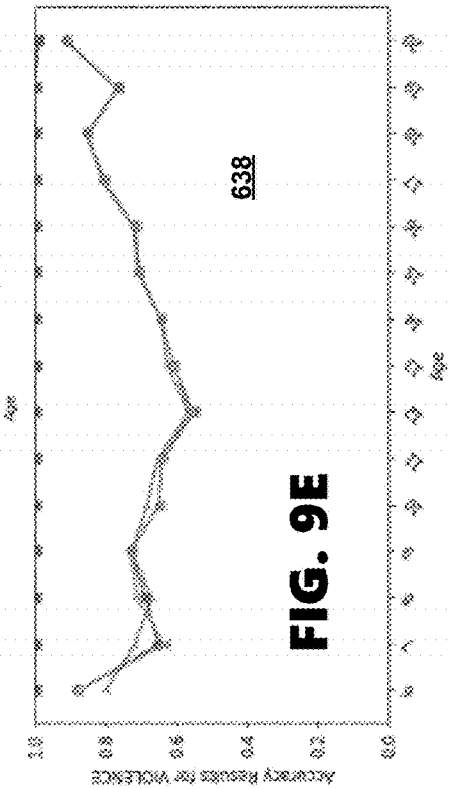

Referring to the charts of FIGS. 5A and 9A-9E and the chart key 640 of FIG. 9F, accuracy of the predetermined default settings and accuracy of the neural network as trained by the first training using the first input dataset ("NN-Age, Region, Phone Type"), as trained by the second training using the second input dataset ("NN-All Features"), and as trained by the third training using the third input dataset ("NN-Violence as Extra Input") are plotted in charts 630, 632, 634, 636, 638 against the age of the supervised users respectively for the filter settings of illicit "drugs" (i.e., "drugs, alcohol and gambling") content 232, "gore" content" 234, "nudity" content 236, "sex" (i.e., "sexual") content 238, and "violence" content 240. The charts 630, 634, and 636 show the accuracies of the pre-determined default settings are relatively low for supervised users aged 12-17 as compared with the accuracies of settings generated by the neural network based on the first, second, and third input datasets. Use of the trained neural networks to generate default filter settings provide improvements over the predetermined defaults especially in the case where the neural network is trained using the third input dataset including the filter setting for violence content 240 as an additional input. Since in the third input dataset ("NN-Violence as Extra Input") the user-chosen violence filter settings are input to the neural network, by definition the predicted "violence" filter setting and user-chosen "violence" setting are the same and the decimal accuracy is therefore 1.0 across the range of ages as shown in the chart 638 of FIG. 9E. The pre-determined default settings for the filter settings of illicit "drugs" (i.e., "drugs, alcohol and gambling") content 232, "gore" content" 234, "nudity" content 236, "sex" (i.e., "sexual") content 238, and "violence" content 240 were to block the content for supervised users aged eleven (11) or younger and unblock the content for users aged twelve (12) and older.

Referring to the charts of FIGS. 5A and 10A-10E and the chart key 670 of FIG. 10F, the number of users blocking the various categories was predicted by the neural network as trained by the first training using the first input dataset ("NN-Age, Region, Phone Type"), as trained by the second training using the second input dataset ("NN-All Features"), and as trained by the third training using the third input dataset ("NN-Violence as Extra Input") which data is plotted with the actual user-chosen settings and the pre-determined default settings in charts 660, 662, 664, 666, and 668 as a decimal of the total supervising users against the age of the supervised users respectively for the filter settings of illicit "drugs" (i.e. "drugs, alcohol and gambling") content 232, "gore" content" 234, "nudity" content 236, "sex" (i.e., "sexual") content 238, and "violence" content 240. As shown, the predetermined default filter setting in each chart 660, 662, 664, 666, and 668 is "blocked" for ages six (6) though eleven (11), thereby corresponding to a decimal of 1.0, and "unblocked" for ages twelve (12) through twenty (20), thereby corresponding to a decimal of 0.0. Since in the third input dataset ("NN-Violence as Extra Input") the user-chosen violence filter settings are input to the neural network, by definition the predicted "violence" filter setting and user-chosen "violence" setting are the same and shown as equal across the range of ages in the chart 668 of FIG. 10E.

Referring to the charts of FIGS. 11A-11D and the chart key 698 of FIG. 11E, accuracy of the predetermined default settings and accuracy of the neural network as trained by the first training using the first input dataset ("NN-Age, Region, Phone Type"), as trained by the second training using the second input dataset ("NN-All Features"), and as trained by the third training using the third input dataset ("NN-Violence as Extra Input") are plotted in charts 690, 692, 694, and 696 against the age of the supervised users respectively for the filter settings of "hacking" content 224, "hate" content 226, "pornography" content 228, and "self-harm" content 230. The charts 630, 632, 634, and 636 show the accuracies of the pre-determined default settings are comparable with the accuracies of settings generated by the neural network based on the first, second, and third input datasets. The pre-determined default settings for the filter settings of "hacking" content 224, "hate" content 226, "pornography" content 228, and "self-harm" content 230 were to block the content for all supervised users of all ages.

Example 2

Figure 7B:
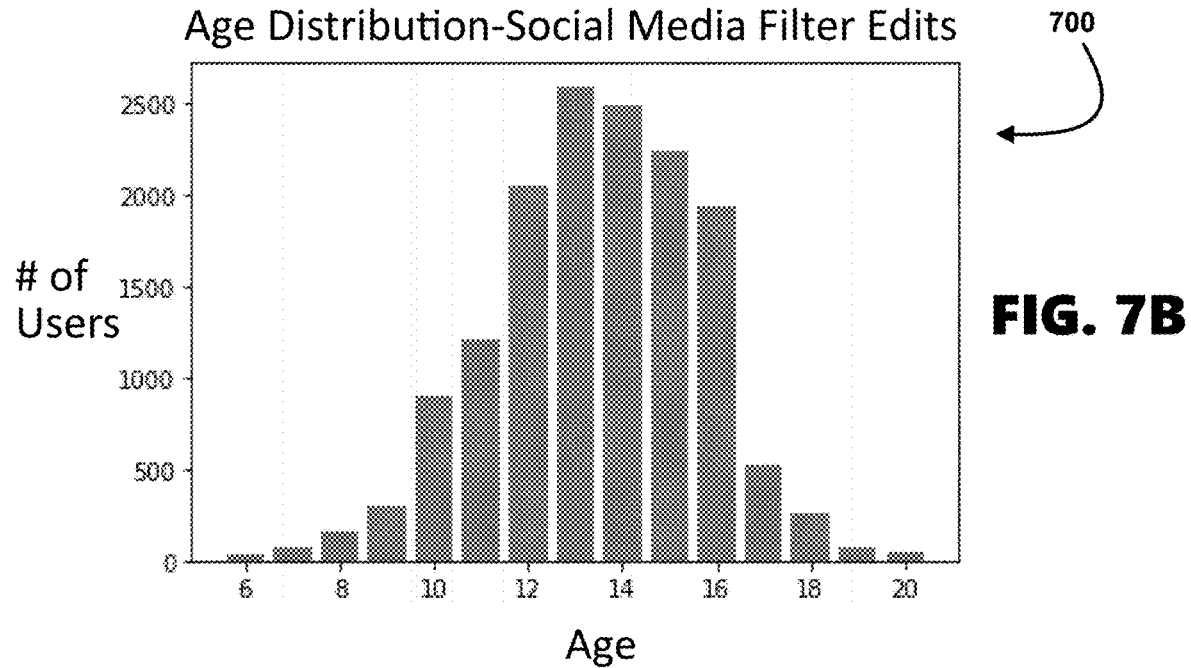

A total of 15,742 supervising users (e.g., parents) of 15,742 supervised users (e.g., children of the parents) each entered the age of their corresponding supervised user and interacted with filters displayed via the settings application 40 and settings API 28. During the interaction the supervising users were enabled to modify predetermined default filter settings for blocked social media applications in a user interface of their devices, the filter settings presented in the manner shown in the second display 110 of FIG. 2B. The predetermined default filter settings were generated based only on a user-indicated age of the supervised user whose device was to be content-filtered, not based on any machine learning algorithm. Using the terminology and reference numerals set forth in FIG. 5B, the filters displayed enabled users to choose between the blocking or unblocking of social media applications including After School™ 324, Snapchat™ 326, Tumbler™ 328, Whisper™ 330, Facebook™ 334, Instagram™ 336, Pinterest™ 338, and Twitter™ 340. Referring to FIG. 7B, a second age distribution chart 700 shows the number of the 15,742 supervised users of particular ages corresponding to those of the 15,742 supervising users who edited one or more of the default filter settings for restricting social media applications. Supervised users aged twelve (12) to seventeen (17) years are 75.3% of the 15,742 supervised users.

A trial artificial neural network generally of the type shown figuratively in FIG. 5B, though not with the same configuration or number of nodes, was trained in three separate manners with the filter settings chosen by, or left as default by, the supervising users used as the desired outputs. In a first training, a first dataset was input to the neural network including age of the supervising user's child 204 (the "supervised user"), device type and manufacturer 206, and geographic region of the supervising user 208. In a second training, a second dataset was input to the neural network including the inputs of the first training plus gender of supervising user 210, number of children of the supervising user 212, income of supervising user 214, and the time 316 for the supervising user to choose the filter settings ("edit time"). In a third training, a third dataset was input to the neural network including the inputs of the first and second trainings plus one filter setting ("filter edit") 318 provided by the supervising user of the user device 16, wherein the filter setting 318 was the filter setting for the Twitter™ social media application 340. An accuracy of the neural network as trained by the first training was determined for each filter setting by re-inputting the first input dataset to the neural network as trained by the first training and comparing the generated output with the actual filter settings chosen by the user. An accuracy of the neural network as trained by the second training was determined for each filter setting by re-inputting the second input dataset to the neural network as trained by the second training and comparing the generated output with the actual filter settings chosen by the user. An accuracy of the neural network as trained by the third training was determined for each filter setting by re-inputting the third input dataset to the neural network as trained by the third training and comparing the generated output with the actual filter settings chosen by the user. Accuracy is defined for a particular filter setting as the average number of correct filter predictions (i.e. the user's chosen filter setting was the same as the neural network output) divided by the total number of predictions by the neural network for that filter setting.

Referring to FIGS. 5B, 12A and 12B, accuracy of the neural network as trained by the first training using the first input dataset ("NN-Age, Region, Phone Type"), as trained by the second training using the second input dataset ("NN-All Features"), and as trained by the third training using the third input dataset ("NN-Twitter as Extra Input") and accuracy of the pre-determined default settings are plotted in a chart 610 against filters for social media applications including After School™ 324, Snapchat™ 326, Tumbler™ 328, Whisper™ 330, Askfm™, Facebook™ 334, Instagram™ 336, Pinterest™ 338, Twitter™ 340, and Wishbone™. The chart 710 and the key 712 of the chart 710 show that inputting the third input dataset to the neural network including the user-chosen filter setting for the Twitter™ application results in outputs for After School™ 324, Snapchat™ 326, Tumbler™ 328, Whisper™ 330, Askfm™, Facebook™ 334, Instagram™ 336, Pinterest™ 338, and Wishbone™ that are significantly higher in predictive accuracy than outputs resulting from input of the first and second input datasets and higher in predictive accuracy than the pre-determined default settings, particularly for Snapchat™ 326. In inputting the third dataset, the input filter setting 318 is the same as the known output filter setting for the Twitter™ 340 application, and accordingly the accuracy is by definition 1.0 (i.e., 100%) for the Twitter™ 340 application for "NN-Twitter as Extra Input" as shown in the chart 710. The data plotted in FIG. 12A suggests a process in which the supervising user (e.g., a parent) is first enabled to choose a filter setting for one application, (e.g., Twitter™), and then in which default settings are generated from the neural network for the remaining categories, results in default settings which accurately predict the user's actual desired filter settings thereby speeding up the application initialization process.

Figure 13A:
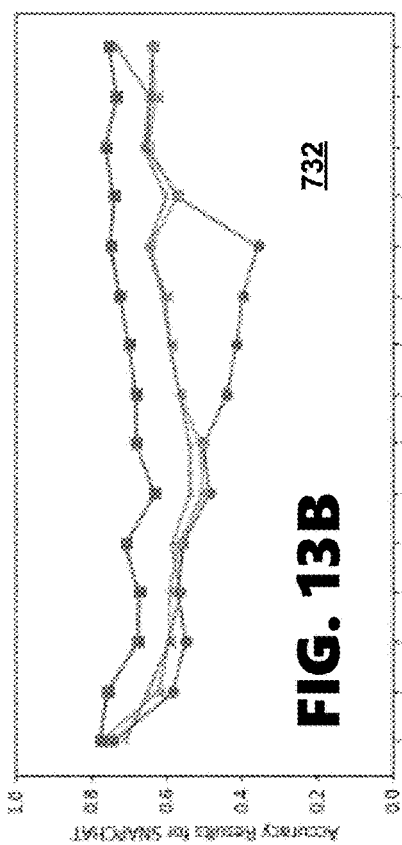
FIGS. 13A-13L are line charts and chart keys showing accuracy of predicted filter settings by age of test users in an implementation of a trial artificial neural network for setting device control filters.
Figure 13B:
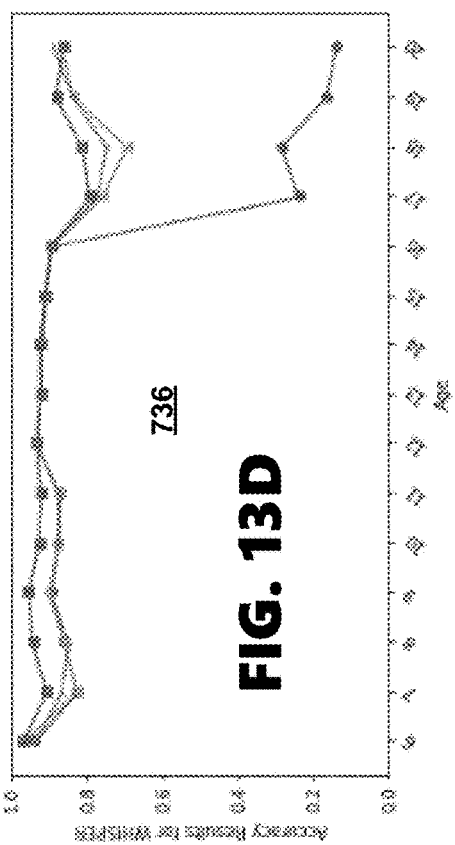
Figure 13C:
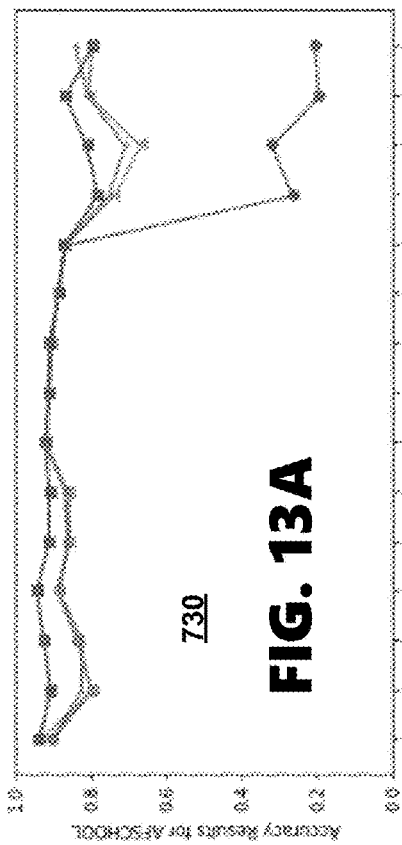
Figure 13D:
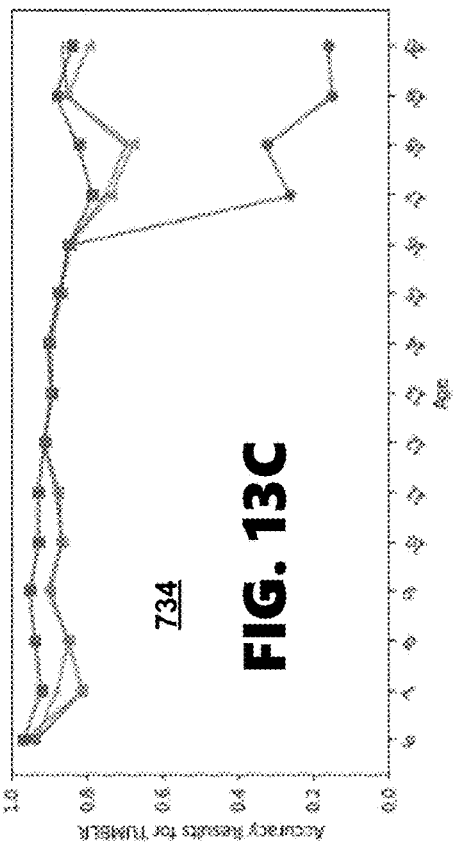
Figure 13E:
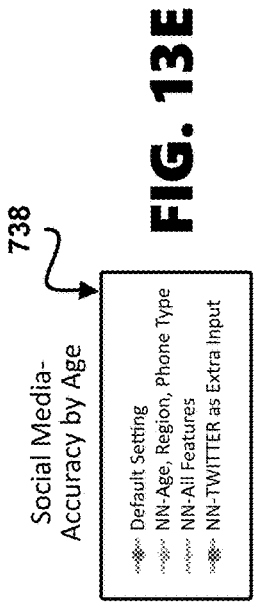
Figure 13F:
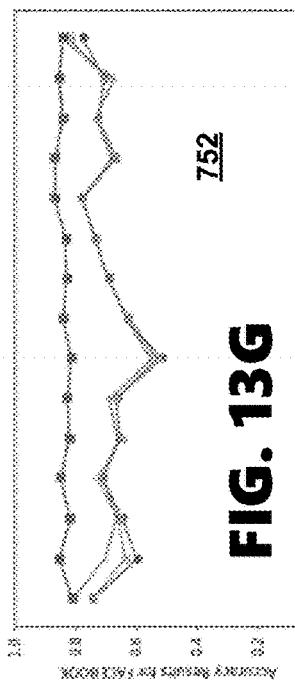
Figure 13H:
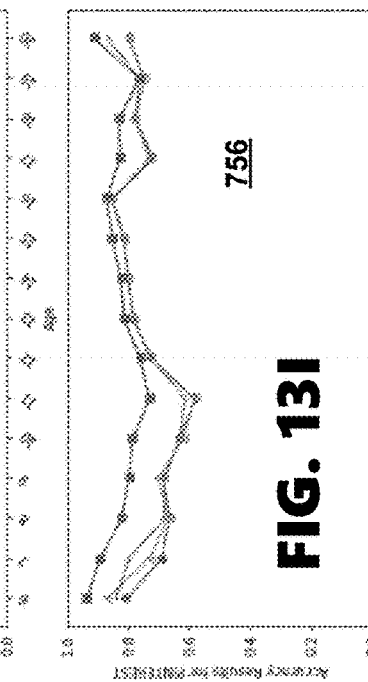
Figure 13J:
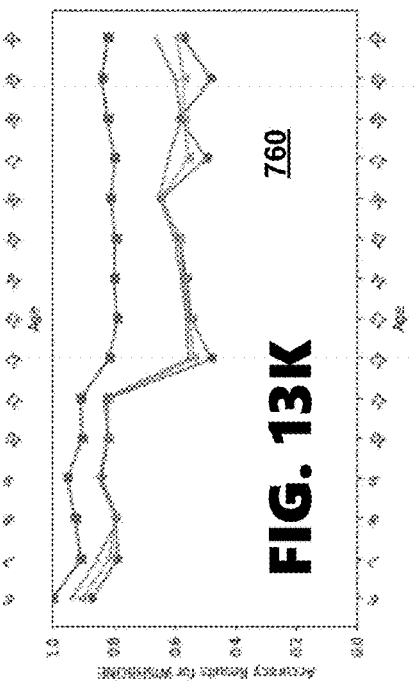
Figure 13G:
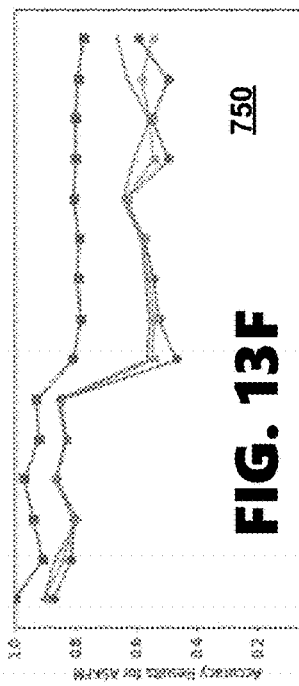
Figure 13I:
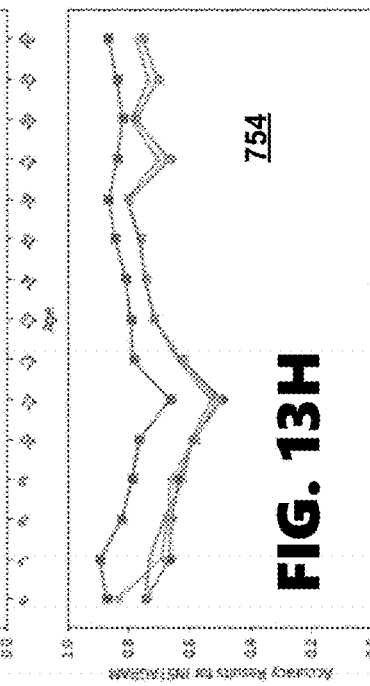
Figure 13K:
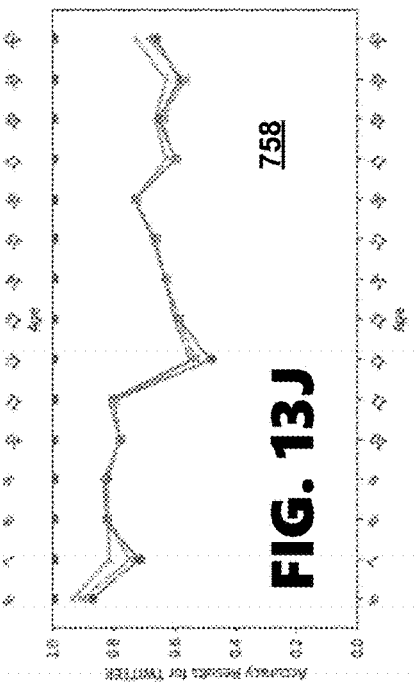
Figure 13L:
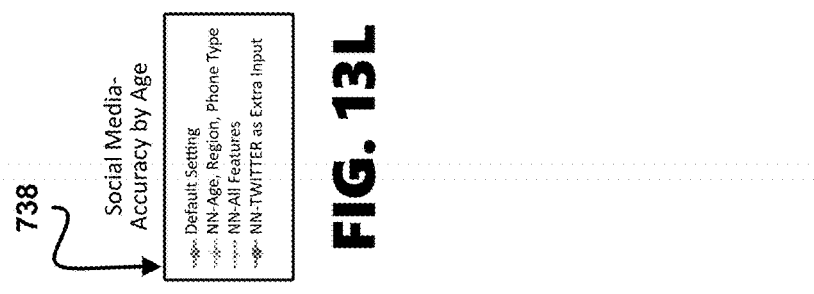
Figure 15:
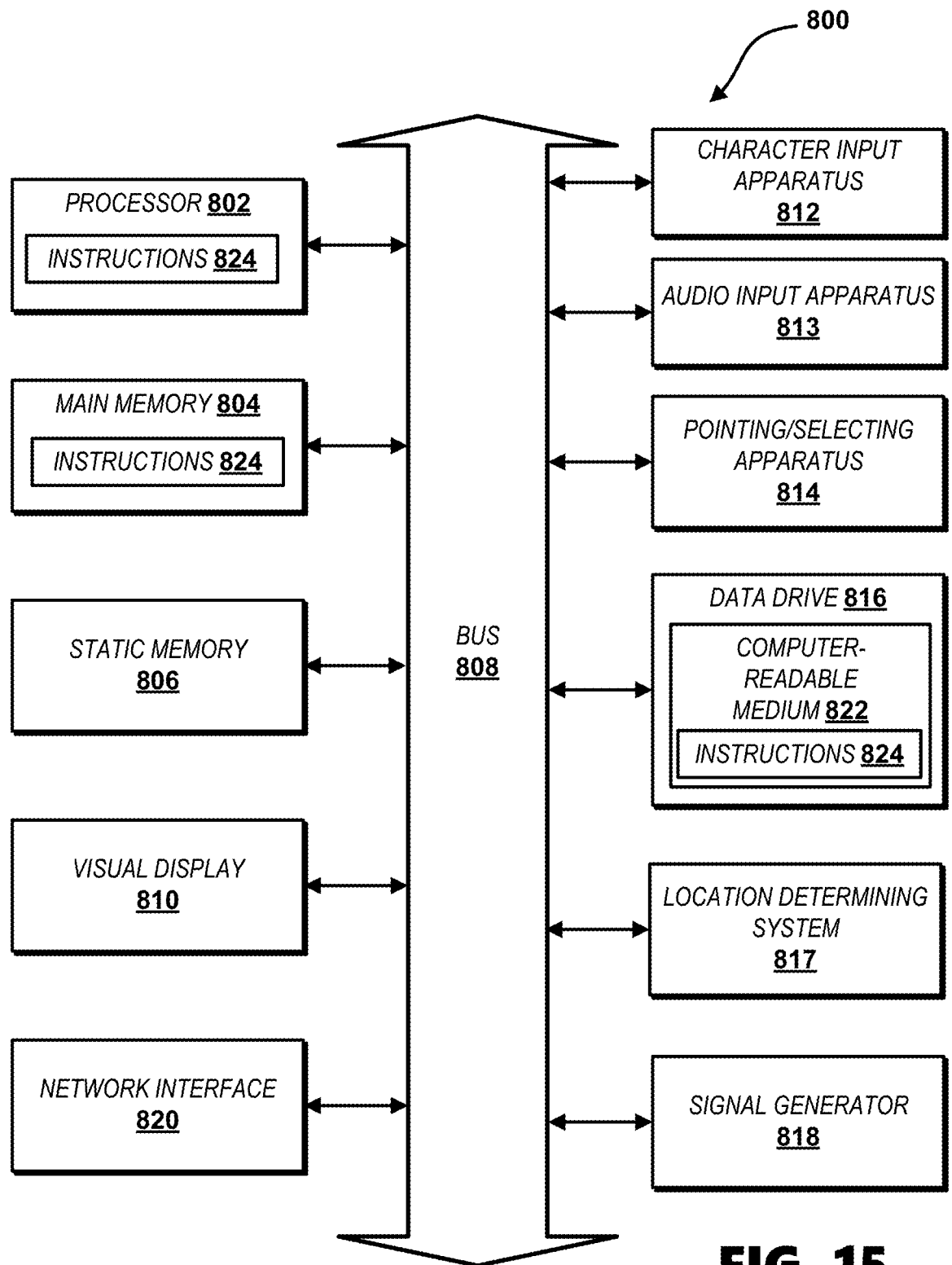
FIG. 15 is an illustrative computer system for performing described filter setting methods according to the illustrative embodiments.

Referring to the charts of FIGS. 5B, 13A-13D and 13F-13K, and the chart key 738 of FIGS. 13E and 13L, accuracy of the predetermined default settings and accuracy of the neural network as trained by the first training using the first input dataset ("NN-Age, Region, Phone Type"), as trained by the second training using the second input dataset ("NN-All Features"), and as trained by the third training using the third input dataset ("NN-Twitter as Extra Input") are plotted in charts 730, 732, 734, 736, 750, 752, 754, 756, 758, and 760 against the age of the supervised users respectively for the filter settings of the After School™ 324, Snapchat™ 326, Tumbler™ 328, Whisper™ 330, Askfm™, Facebook™ 334, Instagram™ 336, Pinterest™ 338, Twitter™ 340, and Wishbone™ applications. The charts 730, 734, and 736 show that the accuracies of the pre-determined default settings are very low for supervised users aged 17-20 as compared with the accuracies of settings generated by the neural network based on the first, second, and third input datasets. The chart 732 for Snapchat™ shows the accuracies of the pre-determined default settings are relatively low as compared with the accuracies of settings generated by the neural network based on the third input datasets, especially for supervised users aged 13-16. The data shows that use of the trained neural networks to generate default filter settings can provide improvements over the predetermined default settings especially in the case where the neural network is trained using the third input dataset including the filter setting for the Twitter™ application 340 as an additional input. Since in the third input dataset ("NN-Twitter as Extra Input") the user-chosen Twitter™ filter settings are input to the neural network, by definition the predicted Twitter™ filter setting and the user-chosen Twitter™ filter setting are the same, and the decimal accuracy is therefore 1.0 across the range of ages as shown in the chart 758 of FIG. 13J. The pre-determined default settings for After School™ 324, Snapchat™ 326, Tumbler™ 328, Whisper™ 330 were to block the applications for supervised users aged sixteen (16) or younger and unblock the applications for users aged seventeen (17) and older. The pre-determined default settings for Askfm™, Facebook™ 334, Instagram™ 336, Pinterest™ 338, Twitter™ 340, and Wishbone™ applications were to block the applications for supervised users aged eleven (11) or younger and unblock the applications for users aged twelve (12) and older.

Referring to the charts of FIGS. 5B and 14A-14F and the chart key 792 of FIG. 14G, the number of users blocking the various social applications was predicted by the neural network as trained by the first training using the first input dataset ("NN-Age, Region, Phone Type"), as trained by the second training using the second input dataset ("NN-All Features"), and as trained by the third training using the third input dataset ("NN-Violence as Extra Input") which data is plotted with the actual user-chosen settings and the pre-determined default settings in charts 780, 782, 784, 786, 788 and 790 as a decimal of the total supervising users against the age of the supervised users respectively for the filter settings of the Askfm™, Facebook™ 334, Instagram™ 336, Pinterest™ 338, Twitter™ 340, and Wishbone™ applications. As shown, the predetermined default filter setting in each chart 780, 782, 784, 786, 788 and 790 is "blocked" for ages six (6) though eleven (11), thereby corresponding to a decimal of 1.0, and "unblocked" for ages twelve (12) through twenty (20), thereby corresponding to a decimal of 0.0. Since in the third input dataset ("NN-Twitter as Extra Input") the user-chosen Twitter™ application filter settings are input to the neural network, by definition the predicted Twitter™ application filter setting and user-chosen Twitter™ application filter setting are the same and shown as equal across the range of ages in the chart 788 of FIG. 14E.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A content filter setting method comprising:
    enabling a plurality of users to choose a plurality of filter settings of a plurality of filters of a particular application;
    receiving the plurality of filter settings from the plurality of users;
    receiving a plurality of identifying information of the plurality of users;
    training an artificial neural network at least based on the plurality of filter settings and the plurality of identifying information of the plurality of users;
    enabling a particular user to choose a particular setting of at least one particular filter of the particular application in a user interface of a first device;
    receiving from the particular user via the user interface the particular setting of the at least one particular filter;
    receiving particular identifying information of the particular user;
    inputting the particular setting and the particular identifying information to the artificial neural network to generate a plurality of default settings of the plurality of filters of the particular application;
    displaying the plurality of default settings in the user interface;
    enabling the particular user to modify the default settings via the user interface;
    providing the particular application as a content control application executed on a second device;
    receiving from the particular user modifications of the default settings;
    applying via network communication the modifications of the default settings from the particular user to the particular application executed on the second device; and
    controlling by the particular application content accessible on the second device based on the modifications of the default settings from the particular user.

2. The method of claim 1, wherein training the artificial neural network comprises inputting at least the plurality of identifying information to the artificial neural network and providing the plurality of filter settings as expected output of the artificial neural network.

3. The method of claim 2, wherein training the artificial neural network further comprises inputting a certain setting of the plurality of filter settings from the plurality of users to the artificial neural network, the certain setting from the plurality of users corresponding to the particular setting from the particular user.

4. The method of claim 1, further comprising receiving the plurality of identifying information as at least one of user age, device type, geographic area, or user gender.

5. The method of claim 4, further comprising receiving the particular identifying information as at least one of user age, device type, geographic area, or user gender.

6. The method of claim 1, further comprising:
    enabling the particular user to choose the particular setting of the at least one particular filter in a first display of the user interface; and
    displaying the plurality of default settings in a second display of the user interface.

7. The method of claim 1, further comprising further training the artificial neural network based on the modifications of the default settings received from the particular user.

8. The method of claim 1, further comprising enabling the plurality of users to choose the plurality of filter settings for filters for at least one of illicit drug content, violence content, or sexual content.

9. The method of claim 8, wherein enabling the particular user to choose the particular setting of the at least one particular filter comprises enabling the particular user to choose a particular setting of a violence filter for the violence content.

10. The method of claim 9, wherein receiving from the particular user via the user interface the particular setting of the at least one particular filter comprises receiving an indication from the particular user via the user interface to block the violence content.

11. The method of claim 1, wherein training the artificial neural network comprises:
   receiving a certain setting from the plurality of users;
   inputting at least the plurality of identifying information of the plurality of users and the certain setting from the plurality of users to the artificial neural network, the certain setting from the plurality of users and the particular setting from the particular user comprising an indication to at least one of block or unblock violence content; and
   providing the plurality of filter settings as expected output of the artificial neural network, the plurality of filter settings comprising indications to at least one of block or unblock illicit drug content or sexual content.

12. The method of claim 1, further comprising:
   determining a plurality of lengths of time for the plurality of users to choose at least one of the plurality of filter settings;
   training the artificial neural network further based on the plurality of lengths of time for the plurality of users to choose the at least one of the plurality of filter settings;
   determining a particular length of time for the particular user to choose the particular setting of the at least one particular filter; and
   further inputting the particular length of time to the artificial neural network to generate the plurality of default settings of the plurality of filters of the particular application.

13. A content filter setting method comprising:
   enabling a plurality of users to choose a plurality of filter settings of a plurality of filters of a particular application;
   determining a plurality of lengths of time for the plurality of users to choose at least one of the plurality of filter settings;
   receiving the plurality of filter settings from the plurality of users;
   receiving a plurality of identifying information of the plurality of users;
   training an artificial neural network at least based on the plurality of filter settings, the plurality of identifying information of the plurality of users, the plurality of lengths of time for the plurality of users to choose the at least one of the plurality of filter settings;
   enabling a particular user to choose a particular setting of at least one particular filter of the particular application in a user interface of a particular user device;
   receiving from the particular user via the user interface the particular setting of the at least one particular filter;
   determining a particular length of time for the particular user to choose the particular setting of the at least one particular filter;
   receiving particular identifying information of the particular user;
   inputting the particular setting, the particular identifying information, and the particular length of time to the artificial neural network to generate a plurality, of default settings of the plurality of filters of the particular application;
   displaying the plurality of default settings in the user interface; and
   enabling the particular user to modify the default settings via the user interface.

14. A content filter setting method comprising:
   enabling a plurality of users to choose a plurality of filter settings of a plurality of filters of a particular application;
   receiving the plurality of filter settings from the plurality of users;
   receiving a plurality of identifying information of the plurality of users;
   training a model at least based on the plurality of filter settings and the plurality of identifying information of the plurality of users;
   enabling a particular user to choose a particular setting of a particular filter for the particular application in a user interface of a first device during an application initiation process;
   receiving from the particular user via the user interface the particular setting of the particular filter;
   receiving particular identifying information of the particular user;
   applying the model to determine a plurality of default settings of the plurality of filters of the particular application based at least on the particular setting of the particular filter and the particular identifying information of the particular user;
   displaying the plurality of default settings in the user interface;
   receiving modified settings of the default settings via the user interface;
   executing the particular application by a processor on a second device;
   applying via network communication the modified settings from the particular user to the particular application executed by the processor on the second device; and
   controlling by the processor via the particular application content accessible on the second device based on the modified settings.

15. The method of claim 14, further comprising further training the model based at least on the modified settings and the particular identifying information of the particular user.

16. The method of claim 14, wherein the model comprises an artificial neural network and applying the model comprises inputting the particular setting of the particular filter and the particular identifying information of the particular user to the artificial neural network to determine the plurality of default settings.

17. The method of claim 14, wherein controlling the content accessible comprises controlling software executable on the second device.

18. A network-enabled device control system comprising:
   a server comprising at least a first processor and at least a first non-transitory computer readable storage medium having encoded thereon first instructions that when executed by the at least the first processor cause the server to perform a first process including:
      enabling a plurality of users to choose a plurality of filter settings of a plurality of filters of a particular application;
      receiving the plurality of filter settings from the plurality of users;
      receiving a plurality of identifying information of the plurality of users;
      training an artificial neural network at least based on the plurality of filter settings and the plurality of identifying information of the plurality of users;
      enabling a particular user to choose a particular setting of a particular filter of the particular application in a user interface of a particular user device;
      receiving from the particular user via the user interface the particular setting of the particular filter;

receiving particular identifying information of the particular user;

applying the artificial neural network to determine a plurality of default settings of a plurality of filters of the particular application based at least on the particular setting of the particular filter and the particular identifying information of the particular user;

enabling a displaying of the plurality of default settings in the user interface;

receiving from the particular user modified settings of the default settings via the user interface; and transmitting an indication of the modified settings; and a computing device comprising at least a second processor and at least a second non-transitory computer readable storage medium having encoded thereon second instructions that when executed by the at least the second processor cause the computing device to perform a second process including:

executing the particular application as a content control application;

receiving the indication of the modified settings from the server;

applying the modified settings to the particular application; and controlling by the particular application content accessible on the computing device based on the indication of the modified settings.

19. The network-enabled device control system of claim 18, wherein the controlling the content comprises blocking electronic messaging content.

20. The network-enabled device control system of claim 18, wherein the controlling the content comprises at least one of blocking execution or blocking download of a certain application.

21. A content filter setting method comprising:

enabling a plurality of users to choose a plurality of filter levels of a plurality of filters of a particular application;

enabling the plurality of users to choose a plurality of filter settings of the plurality of filters of the particular application;

receiving the plurality of filter levels and the plurality of filter settings from the plurality of users;

receiving a plurality of identifying information of the plurality of users;

training an artificial neural network at least based on the plurality of filter levels, the plurality of filter settings, and the plurality of identifying information of the plurality of users;

enabling a particular user to choose a particular filter level of the plurality of filters of the particular application in a user interface of a first device;

receiving from the particular user via the user interface the particular filter level;

receiving particular identifying information of the particular user;

inputting the particular filter level and the particular identifying information to the artificial neural network to generate a plurality of default settings of the plurality of filters of the particular application;

displaying the plurality of default settings in the user interface;

enabling the particular user to modify the default settings via the user interface;

receiving from the particular user modifications of the default settings;

providing the particular application as a content control application executed on a second device;

applying via network communication the modifications of the default settings from the particular user to the particular application executed on the second device; and controlling by the particular application content accessible on the second device based on the modifications of the default settings from the particular user.

* * * * *